United States Patent
Chen et al.

(10) Patent No.: US 12,517,067 B2
(45) Date of Patent: *Jan. 6, 2026

(54) RADIATION INSPECTION SYSTEM

(71) Applicants: NUCTECH COMPANY LIMITED, Beijing (CN); TSINGHUA UNIVERSITY, Beijing (CN)

(72) Inventors: Zhiqiang Chen, Beijing (CN); Lei Liu, Beijing (CN); Shangmin Sun, Beijing (CN); Chunguang Zong, Beijing (CN); Yu Hu, Beijing (CN); Yuan Ma, Beijing (CN); Zheng Ji, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 197 days.

This patent is subject to a terminal disclaimer.

(21) Appl. No.: 18/259,772

(22) PCT Filed: Dec. 15, 2021

(86) PCT No.: PCT/CN2021/138222
§ 371 (c)(1),
(2) Date: Jun. 28, 2023

(87) PCT Pub. No.: WO2022/143164
PCT Pub. Date: Jul. 7, 2022

(65) Prior Publication Data
US 2024/0085349 A1  Mar. 14, 2024

(30) Foreign Application Priority Data
Dec. 31, 2020 (CN) .......................... 202011639188.6

(51) Int. Cl.
*G01N 23/04* (2018.01)
*G01N 23/10* (2018.01)
*G01V 5/22* (2024.01)

(52) U.S. Cl.
CPC ............ *G01N 23/04* (2013.01); *G01N 23/10* (2013.01); *G01V 5/22* (2024.01)

(58) Field of Classification Search
CPC .................. G01N 23/04; G01N 23/10; G01N 2223/316; G01N 2223/643; G01V 5/00; G01V 5/20; G01V 5/22
See application file for complete search history.

(56) References Cited

U.S. PATENT DOCUMENTS 6,453,003 B1   9/2002 Springer et al.
9,820,706 B2 * 11/2017 Fortuna ................ A61B 6/0407
(Continued)

FOREIGN PATENT DOCUMENTS

CN   101066489 A   11/2007
CN   101162206 A   4/2008
(Continued)

OTHER PUBLICATIONS

ISR and Written Opinion of ISA received in PCT/CN2021/138222; mailed Mar. 9, 2022.
(Continued)

*Primary Examiner* — Jurie Yun
(74) *Attorney, Agent, or Firm* — Kilpatrick Townsend & Stockton LLP

(57) ABSTRACT

The present disclosure provides a radiation inspection system, including a container respectively provided with an entrance and an exit on opposite side walls thereof; and a radiation scanning imaging device disposed in the container and having an inspection channel. The radiation scanning imaging device includes a ray source, the ray source includes ray generators, and ray generators are configured to emit ray beams at different angles, so that the radiation scanning imaging device performs radiation scanning (Continued)

inspection on an object to be inspected passing through the inspection channel from the entrance to the exit.

19 Claims, 13 Drawing Sheets

(56) References Cited

U.S. PATENT DOCUMENTS

| | | | |
|---|---|---|---|
| 2006/0056584 | A1 | 3/2006 | Allman et al. |
| 2007/0133740 | A1 | 6/2007 | Kang et al. |
| 2011/0038453 | A1 | 2/2011 | Morton et al. |
| 2017/0276619 | A1* | 9/2017 | Tang ................. G01V 5/22 |

FOREIGN PATENT DOCUMENTS

| | | |
|---|---|---|
| CN | 101482653 A | 7/2009 |
| CN | 101887176 A | 11/2010 |
| CN | 102484935 A | 5/2012 |
| CN | 202776338 U | 3/2013 |
| CN | 103226114 A | 7/2013 |
| CN | 104483711 A | 4/2015 |
| CN | 104991282 A | 10/2015 |
| CN | 106353831 A | 1/2017 |
| CN | 108542417 A | 9/2018 |
| CN | 208492131 U | 2/2019 |
| CN | 109521481 A | 3/2019 |
| CN | 208618897 U | 3/2019 |
| CN | 110286414 A | 9/2019 |
| CN | 111498322 A | 8/2020 |
| JP | H0928699 A | 2/1997 |
| JP | 2021071360 A | 5/2021 |
| WO | 2011008718 A1 | 1/2011 |

OTHER PUBLICATIONS

Notice of Allowance received in CN Application No. 202011639188.6; mailed Jul. 10, 2024.

First office action received in the counterpart Chinese application 202011639188.6, mailed on Sep. 23, 2023.

* cited by examiner

RADIATION INSPECTION SYSTEM

CROSS-REFERENCES TO RELATED APPLICATIONS

The present disclosure is a national phase application of International Application No. PCT/CN2021/138222, filed on Dec. 15, 2021, which claims priority to Chinese Application No. 202011639188.6, filed on Dec. 31, 2020, the entireties of which are herein incorporated by reference.

FIELD

The present disclosure relates to the field of radiation inspection, in particular to a radiation inspection system.

BACKGROUND

In the prior art of safety inspection field, containers, vehicles and other objects are often inspected by radiation rays. A radiation inspection system uses the radiation rays to scan the object, and a detector receives the radiation rays reflected or transmitted by the object for imaging, so as to inspect the object. Since sometimes there is a problem of overlapping object images in propagation paths of ray beams, it is difficult to accurately identify an outline of the inspected object from the image. With the improvement on inspection safety requirements, the requirements on inspection accuracy are also improved.

SUMMARY

The present disclosure provides a radiation inspection system including:
a container, respectively provided with an entrance and an exit on opposite side walls thereof; and
a radiation scanning imaging device disposed in the container and having an inspection channel, and the radiation scanning imaging device includes a ray source, the ray source includes ray generators, and ray generators are configured to emit ray beams at different angles, so that the radiation scanning imaging device performs radiation scanning inspection on an object to be inspected passing through the inspection channel from the entrance to the exit.

In some embodiments, ray generators are configured to alternately turn on and emit the ray beams along with movement of the object to be inspected.

In some embodiments, the radiation scanning imaging device further includes a collimator disposed at a beam output side of ray generators and configured to simultaneously limit ray beam shapes of the ray beams output by ray generators.

In some embodiments, the collimator includes a collimation port, and the collimation port is configured to simultaneously limit the ray beam shapes of the ray beams output by ray generators; or
the collimator includes more than two collimation ports, ray generators are disposed in one-to-one correspondence with the more than two collimation ports, and each collimation port is configured to limit the ray beam shape of the ray beam output by the corresponding ray generator; or
the collimator includes more than two collimation ports, ray generators are grouped and disposed corresponding to the more than two collimation ports, and each collimation port is configured to simultaneously limit the ray beam shapes of the ray beams output by respective ray generators in one corresponding group of ray generators.

In some embodiments, the collimator includes two collimation plates, the two collimation plates are matched in shape to form the collimation port, and the collimation port is configured to limit the ray beam shape of the ray beam output by the corresponding ray generator.

In some embodiments, the collimator includes two collimation plates, the two collimation plates are matched in shape to form the collimation port, the radiation scanning imaging device further includes an adjustment mechanism, and the adjustment mechanism is configured to adjust a size or shape of the collimation port by driving a position of at least one collimation plate relative to the rest collimation plates, and maintain the ray beam shapes of the ray beams output by ray generators after adjustment.

In some embodiments, the adjustment mechanism includes at least one adjustment part, at least one collimation plate is correspondingly provided with the adjustment part, and the adjustment part is configured to change a relative position of the corresponding collimation plate relative to the other collimation plate by driving the corresponding collimation plate to translate and/or rotate, so as to adjust the size or shape of the collimation port.

In some embodiments, at least one of the two collimation plates is provided with a long hole with an extension direction different from an extension direction of the collimation port; the radiation scanning imaging device also includes a ray source cabin body, and ray generators are located in the ray source cabin body;
the adjustment part includes a first threaded connector, and the first threaded connector is configured to cooperate with the long hole variably in relative position and fix the collimation plate where the long hole is located on the ray source cabin body.

In some embodiments, the adjustment part further includes a second threaded connector disposed on the ray source cabin body, and in a state that the first threaded connector fixes the corresponding collimation plate to the ray source cabin body, the second threaded connector is configured and an end surface of one end of the second threaded connector is pressed against an edge of the collimation plate fixed by the first threaded connector away from the collimation port.

In some embodiments, the adjustment part further includes:
a mounting seat fixed on the ray source cabin body and provided with a mounting hole, the second threaded connector being disposed in the mounting hole in a penetrating way; and
a locking nut disposed outside the mounting seat and matched with the second threaded connector to lock the second threaded connector on the mounting seat.

In some embodiments, the entrance and the exit are respectively disposed in two side walls of the container along a length direction and are oppositely disposed.

In some embodiments, the radiation inspection system has a transportation state and a working state, a width of the container is adjustable, and the width of the container in the transportation state is less than the width in the working state;
the radiation inspection system further includes a rotating device disposed in the container and configured to rotate the radiation scanning imaging device during switching of the transportation state and the working state;

and in the transportation state, the radiation scanning imaging device is disposed along the length direction of the container, and in the working state, the radiation scanning imaging device is disposed along a width direction of the container to perform radiation scanning inspection on the object to be inspected.

In some embodiments, the container includes a bottom wall, a top wall, a left wall and a right wall which extend along the length direction, the left wall and the right wall are oppositely disposed along the width direction of the container, the radiation inspection system further includes a driving device, and the driving device is configured to adjust a distance between the left wall and the right wall to adjust the width of the container during switching of the transportation state and the working state.

In some embodiments, the container includes the bottom wall, the top wall, the left wall and the right wall which extend along the length direction, the left wall and the right wall are oppositely disposed along the width direction of the container; and the distance between the left wall and the right wall is adjustable;
the container further includes a first support part and a second support part which are fixedly connected with the left wall and the right wall respectively, and the radiation scanning imaging device is supported on the first support part and the second support part in the working state;
the rotating device includes a rotation part and a support frame which are disposed on the container, in the transportation state, the support frame is detachably connected between the rotation part and the radiation scanning imaging device, the radiation scanning imaging device is supported on the support frame, the rotation part is configured to provide power for rotating the radiation scanning imaging device, and during switching between the transportation state and the working state, the rotation part rotates the radiation scanning imaging device through the support frame.

In some embodiments, the first support part and the second support part both include arc-shaped guide rails, the arc-shaped guide rail includes a fixed end guide rail fixedly connected with the container and an extended end guide rail detachably connected with the fixed end guide rail, in the transportation state and the working state, the extended end guide rail is separated from both the fixed end guide rail and the radiation scanning imaging device, the extended end guide rail is fixedly connected with the fixed end guide rail during switching between the transportation state and the working state, and the fixed end guide rail and the extended end guide rail guide rotation of the radiation scanning imaging device.

In some embodiments, the radiation scanning imaging device includes a first cabin located at the top, and a first support arm and a second support arm which support the first cabin and are located at both ends of the first cabin, and the first support arm and the second support arm are configured to be adjustable in height, so that a height of the first cabin in the transportation state is less than a height in the working state.

In some embodiments, the radiation inspection system further includes a conveying apparatus disposed in the container, and the conveying apparatus is configured to convey the object to be inspected entering the container in the working state, so that the object to be inspected passes through the inspection channel.

In some embodiments, the conveying apparatus includes at least one conveyor configured to convey the object to be inspected, the conveyor includes a self-traveling device, a carrying apparatus and a wheel pitch self-adaptive adjustment apparatus, the carrying apparatus is disposed on the self-traveling device, and the wheel pitch self-adaptive adjustment apparatus is in driving connection with the self-traveling device, and configured to adjust a wheel pitch of the self-traveling device;
a sensor configured to measure width information of the object to be inspected; and
a control apparatus in signal connection with the sensor and the wheel pitch self-adaptive adjustment apparatus, and configured to calculate a target wheel pitch of the self-traveling device according to the width information detected by the sensor and control the wheel pitch self-adaptive adjustment apparatus to adjust the wheel pitch of the self-traveling device to the target wheel pitch.

In some embodiments, the self-traveling device includes a first walking part and a second walking part which are disposed at intervals along a transverse direction, and the transverse direction is consistent with the width direction of the container;
the carrying apparatus includes a first carrying part and a second carrying part which are disposed at intervals along the transverse direction, the first carrying part is disposed on the first walking part, and the second carrying part is disposed on the second walking part;
the wheel pitch self-adaptive adjustment apparatus is configured to adjust a distance between the first carrying part and the second carrying part along the transverse direction of the conveyor, so as to adjust the distance between the first walking part and the second walking part along the transverse direction, to adjust the wheel pitch of the self-traveling device.

In some embodiments, the wheel pitch self-adaptive adjustment apparatus includes:
a driving unit disposed on the first carrying part; and
a transmission unit including a first transmission part and a second transmission part, and the first transmission part is in driving connection with the driving unit, the second transmission part is disposed on the second carrying part and is in driving connection with the first transmission part, and the transmission unit is configured to convert movement of an output part of the driving unit into relative movement of the first carrying part and the second carrying part through the first transmission part and the second transmission part, so as to adjust the distance between the first carrying part and the second carrying part along the transverse direction.

In some embodiments, the at least one conveyor includes:
a first conveyor; and
a second conveyor configured to receive and continuously convey the object to be inspected on the first conveyor;
and the sensor is disposed on the first conveyor.

In some embodiments, the control apparatus includes:
a first instruction signal transceiving apparatus in signal connection with the sensor and the wheel pitch self-adaptive adjustment apparatus of the first conveyor;
a second instruction signal transceiving apparatus in signal connection with the wheel pitch self-adaptive adjustment apparatus of the second conveyor; and
an instruction signal transceiving processing apparatus in signal connection with the first instruction signal transceiving apparatus and the second instruction signal transceiving apparatus, and configured to calculate the target wheel pitch according to the width information of the object to be inspected detected by the sensor, control the wheel pitch self-adaptive adjustment apparatus of the first conveyor to adjust the wheel pitch of the first self-traveling device to the target wheel pitch through the first instruction signal transceiving apparatus, and control the wheel pitch self-adaptive adjustment apparatus of the second conveyor to adjust the wheel pitch of the self-traveling device to the target wheel pitch through the second instruction signal transceiving apparatus.

In some embodiments, the conveying apparatus includes at least one conveyor configured to convey the object to be inspected, the conveyor including a navigation apparatus, and the conveying apparatus including a movement guide apparatus;

and the navigation apparatus controls the conveyor to move according to a movement path provided by the movement guide apparatus.

In some embodiments, the conveying apparatus further includes an object handling device and at least one conveyor, the at least one conveyor is configured to transport the object to be inspected, and the object handling device is configured to unload the object to be inspected from the conveyor and load the object to be inspected onto the conveyor.

In some embodiments, the container further includes a ramp and the bottom wall extending along the length direction, the ramp is rotatably connected with the bottom wall and is arranged at least one of the entrance and the exit to switch between an unfolded state and a folded state, and in the unfolded state, the ramp is configured to provide guidance for the object to be inspected to enter and leave the container.

In some embodiments, the radiation inspection system further includes a first automatic guided transport vehicle configured to move the object to be inspected from a first target position outside the container to a position close to the entrance, and/or the radiation inspection system further includes a second automatic guided transport vehicle configured to move the object to be inspected from a position close to the exit to a second target position outside the container.

BRIEF DESCRIPTION OF THE DRAWINGS

The accompanying drawings described herein are provided to provide a further understanding to the present disclosure and constitute a part of the present application. The illustrative embodiments of the present disclosure and the explanations thereof are configured to explain the present disclosure and do not constitute undue limitations to the present disclosure. In the figures.

DETAILED DESCRIPTION OF THE DISCLOSURE

Figure 1:
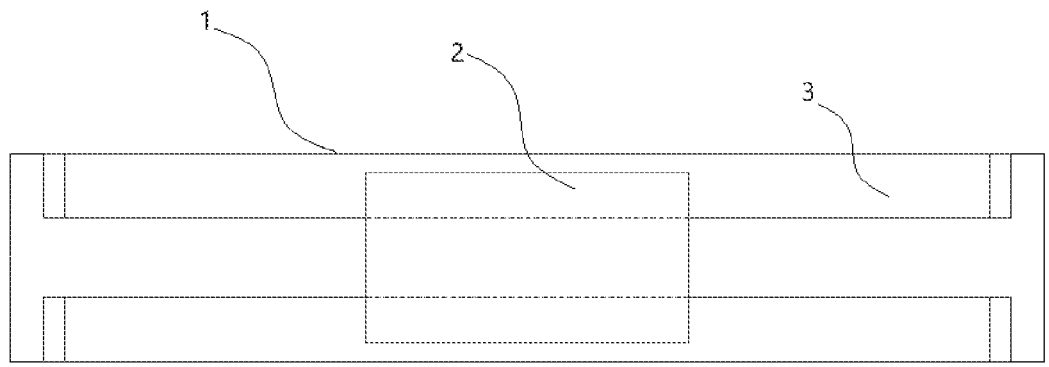
FIG. 1 is a top partial schematic structural diagram of a radiation inspection system in a transportation state according to an embodiment of the present disclosure.

The embodiments of the present disclosure will be clearly and completely described below in combination with the accompanying drawings in the embodiments of the present disclosure. The described embodiments are only a part but not all of the embodiments of the present disclosure. The following description of at least one exemplary embodiment is merely illustrative in nature and is not intended to limit the present disclosure, its application or use in any way.

Unless otherwise specified, the relative arrangement of components and steps, numerical expressions and numerical values set forth in these embodiments do not limit the scope of the present disclosure. At the same time, it should be understood that for the convenience of description, the dimensions of various parts shown in the accompanying drawings are not drawn according to an actual scale relationship. The technologies, methods and devices may not be discussed in detail, but in appropriate cases, the technologies, methods and devices should be regarded as part of the authorization description. In all examples shown and discussed herein, any specific values should be interpreted as illustrative only but not limitative. Therefore, other examples of the exemplary embodiments may have different values. It should be noted that similar numbers and letters indicate similar items in the following accompanying drawings. Therefore, once an item is defined in one accompanying drawing, it does not need to be further discussed in subsequent accompanying drawings.

For the convenience of description, spatially relative terms such as "on", "above", "on the upper surface of" and "upper" may be used here to describe the spatial positional relationship between a device or feature as shown in the figure and other devices or features. It should be understood that the spatially relative terms are intended to encompass different orientations in use or operation in addition to the orientations of the devices depicted in the figures. For example, if the device in the accompanying drawing is inverted, the device described as "above other devices or structures" or "on other devices or structures" will be positioned as "below other devices or structures" or "under other devices or structures". Therefore, the exemplary term "above" can include both orientations of "above" and "below". The device may also be positioned in other different ways (rotated by 90 degrees or in other orientations), and the spatial relative description used here is explained accordingly.

In the section of following embodiments, "back" refers to the direction in which a vehicle 100 subjected to radiation inspection enters a container 1, and "front" refers to the direction in which the vehicle 100 finishing the radiation scanning inspection leaves the container 1; "left" refers to the direction of the left of an operator when the operator faces the front of the container 1 from the back, and "right" refers to the direction of the right of the operator when the operator faces the front of the container 1 from the back. "Up" and "down" are the up and down directions in space. "Top view" refers to viewing from above to below the radiation inspection system, "left view" refers to viewing from the front to the back of the radiation inspection system, and "front view" refers to viewing from the left side to the right side of the radiation inspection system. The length of the container refers to a length of the container in the front and back direction, and the width direction of the container refers to a length of the container in the left and right direction.

Embodiments of the present disclosure provide a radiation inspection system, which can improve the accuracy of scanning inspection of an object to be inspected.

For the radiation inspection system according to the embodiments of the present disclosure, the radiation scanning image device is disposed in the container, so that transition and transportation of the radiation inspection system can be easily realized, and use flexibility can be improved; moreover, by adopting ray generators to form a distributed light source, the ray beams can be emitted from different angles when the object to be inspected passes through the inspection channel, so that imaging of different angles can be realized, and the problem of overlapping object images in propagation paths of the ray beams can be prevented, to accurately inspect an outline of the object, and improving inspection safety.

As shown in FIGS. 1 to 30, the present disclosure provides a radiation inspection system. In some embodiments, as shown in FIGS. 1, 2, 7, 14 and 21, the radiation inspection system includes a container 1 and a radiation scanning imaging device 2. The container 1 is respectively provided with an entrance A and an exit B on opposite side walls thereof. The radiation scanning imaging device 2 is disposed in the container 1 and has an inspection channel G. The radiation scanning imaging device 2 includes a ray source 21 and a detector 26. The ray source 21 includes ray generators 21', and ray generators 21' are configured to emit ray beams at different angles to pass through the object to be inspected to be received by the detector 26, so that the radiation scanning imaging device 2 can perform radiation scanning inspection on the object to be inspected passing through the inspection channel G from the entrance A to the exit B.

In one embodiment, each ray generator 21' may independently control a switch, so as to flexibly control the switch of each ray generator 21' according to inspection requirements.

In one embodiment, positions of ray generators 21' may be distributed in a scanning plane perpendicular to an advancing direction of the object to be inspected, or along the advancing direction of the object to be inspected, or randomly distributed in a three-dimensional space, but it needs to be ensured that the ray beams of respective ray generators 21' are received by the detector.

For the radiation inspection system according to the embodiment of the present disclosure, the radiation scanning image device is disposed in the container, so that the transition and transportation of the radiation inspection system can be easily realized, and the use flexibility can be improved; moreover, by adopting ray generators to form a distributed light source, the ray beams can be emitted from different angles when the object to be inspected passes through the inspection channel, so as to realize multi-view angle imaging, and the problem of overlapping object images in propagation paths of the ray beams is prevented, so that an outline of the object can be accurately inspected. It is convenient to form ray scanning images of different view angles through once scanning, so that suspected objects are easily found, and the inspection safety can be improved.

In some embodiments, center lines of the ray beams emitted by any two of ray generators 21' are coplanar and not collinear. This configuration is beneficial to installation and debugging or synchronous adjustment of the ray beam shapes of the ray beams output by respective ray generators 21'.

In some embodiments, ray generators 21' are configured to alternately turn on and emit the ray beams along with movement of the object to be inspected, so as to emit the ray beams penetrating the object to be inspected along with the movement of the object to be inspected.

In some embodiments, ray generators 21' may realize pulsed beam output, so that X-rays can only be emitted when in a sampling period of the detector, and can be stopped in time when not in the sampling period of the detector. In this way, rapid alternating beam output of different ray generators 21' can be realized, and continuous perspective scanning of different view angles can be realized. The ray generator 21' of only one view angle is activated each time of beam output, so that the rays between different view angles are independent and do not interfere with each other.

In some embodiments, the number of ray generators 21' (that is, the number of imaging view angles) to be used is determined according to different scanning parameters during scanning of the system, and respective ray generators 21' are quickly switched according to a specified beam output order during scanning to scan a target object. For example, the scanning of distributed X-ray sources may be realized based on the technologies such as carbon nanotubes and magnetic confinement, that is, the X-ray beams are generated from different spatial positions on one ray source 21, especially the distributed ray source based on the carbon nanotube technology, which can realize a large number of densely distributed X-ray source points at a very low cost and realize multi-view angle perspective imaging. Therefore, the carbon nanotube distributed ray source can be used to realize the situation that the number of source points exceeds the number of imaging view angles on one system, and the device cost is hardly increased.

In some embodiments, in a scanning process, only the activated ray generators 21' participate in scanning imaging, and the number of activated ray generators 21' may be determined by the following method including: deciding according to a spatial resolution to be achieved of each view angle image along the object to be inspected in combination with a passing speed of the object to be inspected. In the case of a spatial resolution, only a few ray generators 21' are activated if the speed is higher, and more ray generators 21' are activated if the speed is lower. In one embodiment, the number may also be specified manually. At this time, beam output time and beam output current intensity of each ray generator 21' each time may be determined according to the number of ray generators 21', the passing speed of the object to be inspected and an image signal-to-noise ratio.

The embodiment of the present disclosure adopts dual-view angle or multi-view angle imaging. For the dual-view angle or multi-view angle radiation scanning imaging device 2, the ray source 21 generally includes more than two ray generators 21', and one or more than two collimators 22 may be disposed in cooperation with the more than two ray generators 21'.

The radiation scanning imaging device in the radiation inspection system according to the present disclosure includes a ray emitting apparatus, including:
- ray generators, each of which being configured to output the ray beam; and
- a collimator, disposed at a beam output side of ray generators, and configured to simultaneously limit ray beam shapes of the ray beams output by ray generators.

In some embodiments, the collimator includes a collimation port configured to simultaneously limit the ray beam shapes of the ray beams output by ray generators; or the collimator includes more than two collimation ports, ray generators are disposed in one-to-one correspondence with the more than two collimation ports, and each collimation port is configured to limit the ray beam shape of the ray beam output by the corresponding ray generator; or
the collimator includes more than two collimation ports, ray generators are grouped and disposed corresponding to the more than two collimation ports, and each collimation port is configured to simultaneously limit the ray beam shapes of the ray beams output by respective ray generators in one corresponding group of ray generators.

In some embodiments, the collimator includes two collimation plates, and the two collimation plates are matched in shape to form the collimation port.

In some embodiments, the collimation port is a collimation slit in the shape of a straight line, a folded line, a curved line or a combined shape of the straight line and curved line.

In some embodiments, ray generators are configured and the center lines of the ray beams output by any two ray generators are coplanar and not collinear.

In some embodiments, an adjustment mechanism is further included, and the adjustment mechanism is configured to adjust and maintain the ray beam shapes of the ray beams output by ray generators after adjustment.

In some embodiments, the collimator includes two collimation plates, and the adjustment mechanism adjusts the size or shape of the collimation port by driving a position of at least one collimation plate relative to the other collimation plate.

In some embodiments, the adjustment mechanism includes at least one adjustment part, at least one collimation plate is correspondingly provided with the adjustment part, and the adjustment part is configured to change the relative position of the corresponding collimation plate relative to the other collimation plate by driving the corresponding collimation plate to translate and/or rotate so as to adjust the size or shape of the collimation port.

In some embodiments,
- at least one of the two collimation plates is provided with a long hole with an extension direction different from that of the collimation port;
- the ray emitting apparatus also includes a ray source cabin body, and ray generators are located in the ray source cabin body; and
- the adjustment part includes a first threaded connector, and the first threaded connector is configured to cooperate with the long hole variably in relative position and fix the collimation plate where the long hole is located on the ray source cabin body.

In some embodiments, the adjustment part further includes a second threaded connector disposed on the ray source cabin body, and in the state that the corresponding collimation plate is fixed to the ray source cabin body by the first threaded connector, the second threaded connector is configured and the end surface of one end of the second threaded connector is pressed against the edge, away from the collimation port, of the collimation plate fixed by the first threaded connector.

In some embodiments, the adjustment part further includes:
- a mounting seat fixed on the ray source cabin body and provided with a mounting hole, the second threaded connector being disposed in the mounting hole in a penetrating way; and
- a locking nut disposed outside the mounting seat and matched with the second threaded connector to lock the second threaded connector on the mounting seat.

In some embodiments, the adjustment part includes:
a stepping motor in driving connection with the corresponding collimation plate; and
a control apparatus in signal connection with the stepping motor, the stepping motor being configured to act according to a control instruction sent by the control apparatus.

In some embodiments, the adjustment part further includes a transmission component connected between the stepping motor and the corresponding collimation plate and configured to convert rotation of the stepping motor into translation of the collimation plate to change a relative position of the corresponding collimation plate relative to the other collimation plate.

In some embodiments,
the two collimation plates are respectively and correspondingly provided with the adjustment parts, and/or
at least one collimation plate is correspondingly provided with more than two adjustment parts.

The ray emitting apparatus provided based on the present disclosure includes ray generators and one collimator corresponding to ray generators, and the collimator can limit the shapes of the ray beams emitted by ray generators at the same time, which is beneficial to installation and debugging of the ray emitting apparatus. The radiation scanning imaging device according to the present disclosure has the same advantages as the ray emitting apparatus according to the present disclosure.

Other embodiments of the present disclosure will become apparent from the following detailed descriptions of exemplary embodiments of the present disclosure with reference to the accompanying drawings.

Figure 14:
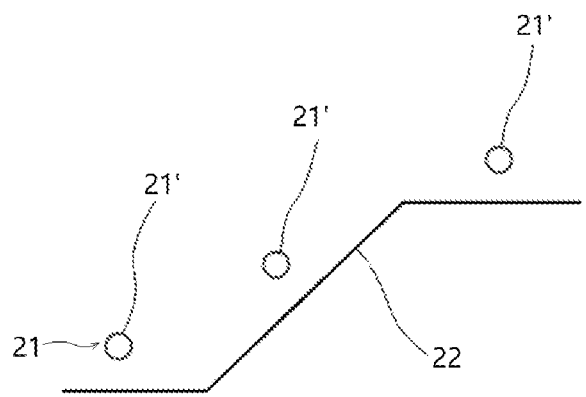
FIG. 14 is a principle schematic structural diagram of one angle of a ray emitting apparatus according to some embodiments of the present disclosure.
Figure 15:
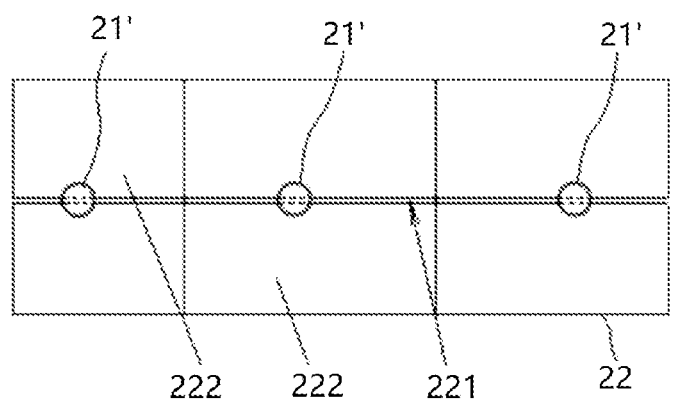
FIG. 15 is a principle schematic structural diagram of another angle of the ray emitting apparatus of the embodiment shown in FIG. 14.
Figure 16:
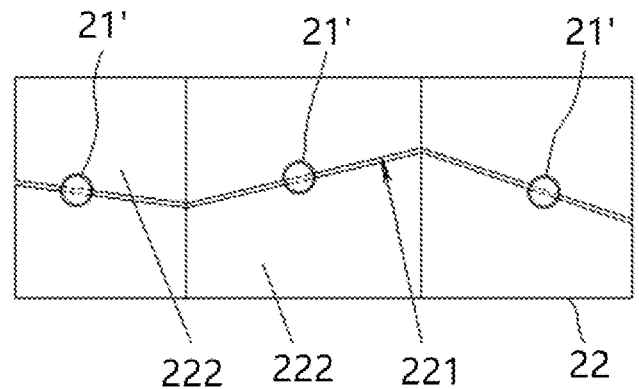
FIG. 16 is a principle schematic structural diagram of another angle of the ray emitting apparatus of the embodiment shown in FIG. 14.

As shown in FIGS. 14 to 16, the radiation scanning imaging device 2 further includes one collimator 22, the ray source 21 includes ray generators 21', and the ray source 21 and the collimator 22 are collectively referred to as the ray emitting apparatus. Each ray generator 21' is configured to output the ray beam. The collimator 22 is disposed at the beam output side of ray generators 21' and configured to simultaneously limit the ray beam shapes of the ray beams output by ray generators 21'.

In some embodiments, as shown in FIGS. 14 to 18, the collimator 22 may include one collimation port 221 configured to simultaneously limit the ray beam shapes of the ray beams output by ray generators 21'.

Figure 19:
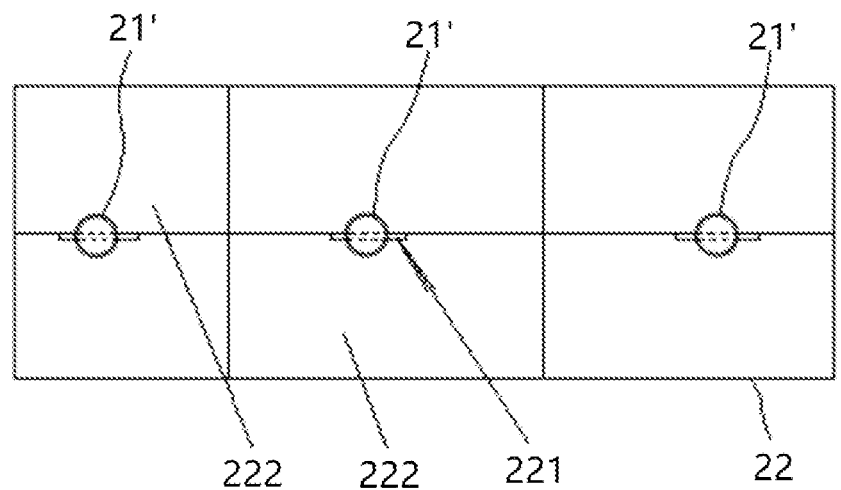
FIG. 19 is a principle schematic structural diagram of one angle of a ray emitting apparatus according to some embodiments of the present disclosure.

In some embodiments, as shown in FIG. 19, the collimator may include more than two collimation ports 221, ray generators 21' are disposed in one-to-one correspondence with the more than two collimation ports 221, and each collimation port 221 is configured to limit the ray beam shape of the ray beam output by the corresponding ray generator 21'.

Figure 20:
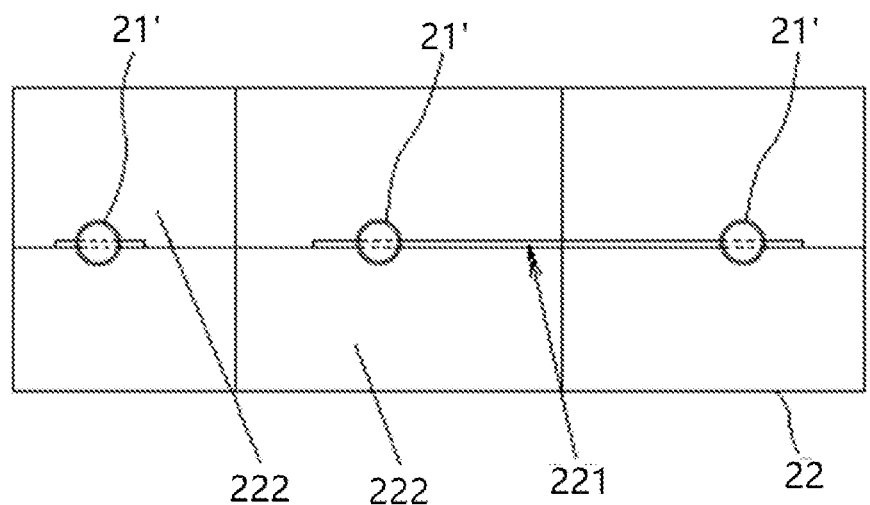
FIG. 20 is a principle schematic structural diagram of one angle of a ray emitting apparatus according to some embodiments of the present disclosure.
Figure 21:
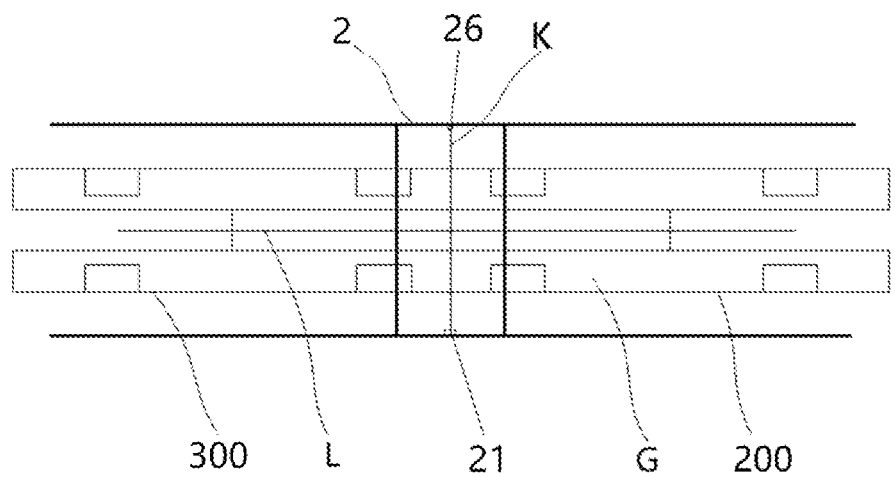
FIG. 21 is a principle schematic diagram of a radiation inspection system according to some embodiments of the present disclosure.

In some embodiments, as shown in FIG. 20, the collimator may include more than two collimation ports 221, ray generators 21' are grouped and disposed corresponding to the more than two collimation ports 221, and each collimation port 221 is configured to limit the ray beam shapes of the ray beams output by respective ray generators 21' in one corresponding group of ray generators 21' or ray generators 21' are grouped and disposed corresponding to the more than two collimation ports 221.

The ray emitting apparatus according to the embodiment of the present disclosure includes ray generators and one collimator corresponding to ray generators, so that the collimator corresponding to ray generators is integrated, and the collimator can limit the shapes of the ray beams emitted by ray generators at the same time, which is beneficial to the installation and debugging of the ray emitting apparatus.

The ray generator 21' may be a ray source generating X-rays, y-rays or neutron rays, and for example, may be an accelerator or an X-ray tube.

As shown in FIGS. 14 to 16, the collimator 22 includes two collimation plates 222, and a gap between the two collimation plates 222 forms the collimation port 221.

In different embodiments, the collimation plate may be disposed into a corresponding shape and structure according to the arrangement of the ray source and beam output needs. For example, the collimation plate may be a flat plate, a folded plate, a curved surface plate or a combined plate of the flat plate and curved surface plate.

As shown in FIGS. 14 to 16, in some embodiments, the collimation port 221 is a folded collimation slit. The collimation port 221 may be a folded collimation slit in the same plane as shown in FIGS. 14 and 15, or a folded collimation slit in a three-dimensional space of the embodiment as shown in FIG. 16.

In some unillustrated embodiments, the collimation port may be set into the corresponding shape and structure according to the arrangement of the ray source and the beam output needs, for example, the collimation port may also be a collimation slit in the shape of a straight line, a curved line or a combined shape of the straight line and curved line.

Moreover, when the collimation port is a collimation slit, the cross-sectional shape or cross-sectional size or shape of the collimation slit may always be the same along the extension direction of the collimation slit, and this way may be set in, for example, the embodiments shown in FIGS. 14 to 18.

In some unillustrated embodiments, the cross-sectional shape or cross-sectional size or shape of the collimation slit may also be changed along the extension direction of the collimation slit. For example, the cross-section at the local position of the collimation slit, such as the beam output position of the corresponding ray source, may be enlarged or reduced relative to other parts, and the shape of the enlarged or reduced part may be set as required, such as square, oval, triangular and circular.

Figure 17:
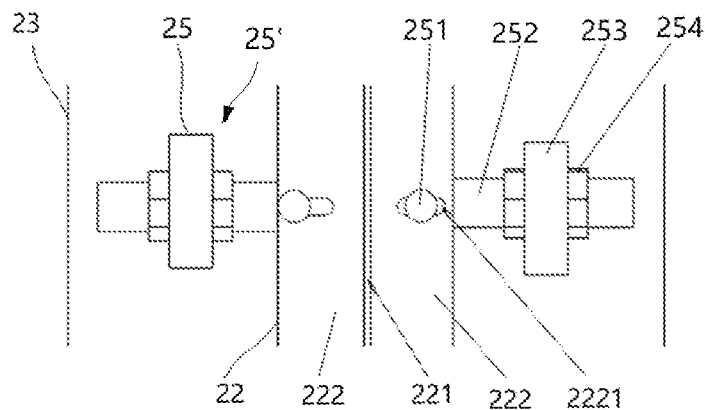
FIG. 17 is a principle schematic structural diagram of one angle of a ray emitting apparatus according to some embodiments of the present disclosure (a ray source is not shown)

As shown in FIG. 17, in order to obtain an appropriate beam shape of the ray beam, in some embodiments, the ray emitting apparatus includes an adjustment mechanism 25'. The adjustment mechanism 25' is configured to adjust and maintain the size or shape of the collimation port 221 after adjustment to adjust the ray beam shapes of the ray beams output by ray generators 21'.

As shown in FIGS. 14 to 18, in some embodiments, the collimator 22 includes two collimation plates 222 disposed side by side at intervals, and the collimation port 221 is formed between the two collimation plates 222.

The adjustment mechanism 25' includes at least one adjustment part 25. At least one collimation plate 222 is correspondingly provided with the adjustment part 25. The adjustment part 25 is configured to adjust the size or shape of the collimation port 221 by changing the relative position of the corresponding collimation plate 222 relative to the other collimation plate 222.

As shown in FIG. 17, in some embodiments, at least one of the two collimation plates 222 is provided with a long hole 2221 with an extension direction different from that of the collimation port 221. The ray emitting apparatus further includes a ray source cabin body 23, and ray generators 21' are located in the ray source cabin body 23. The adjustment part 25 includes a first threaded connector 251, and the first threaded connector 251 is configured to cooperate with the long hole 2221 variably in relative position and fix the collimation plate 222 where the long hole 2221 is located on the ray source cabin body 23.

Through the cooperation between the first threaded connector 251 and the long hole 2221, the size or shape of the collimation port 221 can be adjusted and the collimation port 221 is maintained at the adjusted size or shape. The collimation port 221 can be adjusted by adjusting cooperation positions of the first threaded connector 251 and the long hole 2221, and the adjusted size or shape of the collimation port 221 can be maintained after the first threaded connector 251 is fixed. The first threaded connector 251 is, for example, a screw.

As shown in FIG. 17, in some embodiments, the adjustment part 25 further includes a second threaded connector 252 disposed on the ray source cabin body 23. In the state that the corresponding collimation plate 222 is fixed to the ray source cabin body 23 by the first threaded connector 251, the second threaded connector 252 is configured and the end surface of one end is pressed against the edge, away from the collimation port 221, of the collimation plate 222 fixed by the first threaded connector 251.

The second threaded connector 252 may cooperate with the first threaded connector 251 to jointly maintain the position of the corresponding collimation plate 222. Therefore, after the size or shape of the collimation port 221 is adjusted, it is beneficial to maintain the size or shape of the collimation port 221, and is thus beneficial to maintain the ray beam shape of the adjusted ray beam.

As shown in FIG. 17, in some embodiments, the adjustment part 25 further includes a mounting seat 253 and a locking nut 254. The mounting seat 253 is fixed on the ray source cabin body 23 and has a mounting hole, and the second threaded connector 252 is disposed in the mounting hole in a penetrating way. The locking nut 254 is disposed outside the mounting seat 253 and cooperates with the second threaded connector 252 to lock the second threaded connector 252 on the mounting seat 253.

The mounting hole may be a screw hole or an unthreaded hole cooperating with the second threaded connector 252. When the mounting hole is a screw hole, the locking nut 254 may be disposed on one side of the mounting seat 253, or two or more locking nuts 254 may be disposed on both sides of the mounting seat 253 respectively. When the mounting hole is an unthreaded hole, two or more locking nuts 254 are respectively disposed on both sides of the mounting seat 253. The second threaded connector 252 is, for example, a screw rod.

In FIG. 17, one locking nut 254 is disposed on each of both sides of the mounting seat 253 for locking the second threaded connector 252.

In some embodiments, the two collimation plates 222 are respectively provided with the adjustment parts 25. In some embodiments, at least one collimation plate 222 is correspondingly provided with more than two adjustment parts 25. For example, the two collimation plates 222 are symmetrically provided with adjustment parts 25 of the same number. The number of adjustment parts 25 and a functional relationship with the collimation plates 222 are reasonably set, so that the size or shape of the collimation port 221 can be more flexibly and accurately adjusted.

When the collimation port 221 is adjusted, the first threaded connector 251 and the second threaded connector 252 may be loosened at first, and then the size or shape of the collimation port 221 is adjusted. When the size or shape of the collimation port 221 is adjusted, tools such as a feeler gauge may be used to obtain the appropriate size or shape of the collimation port 221. After the size or shape of the collimation port 221 is adjusted, the first threaded connector 251 is screwed on, then the end surface of the second threaded connector 252 is enabled to abut against the corresponding collimation plate 2221, and the second threaded connector 252 is locked with the locking nut 254.

Figure 18:
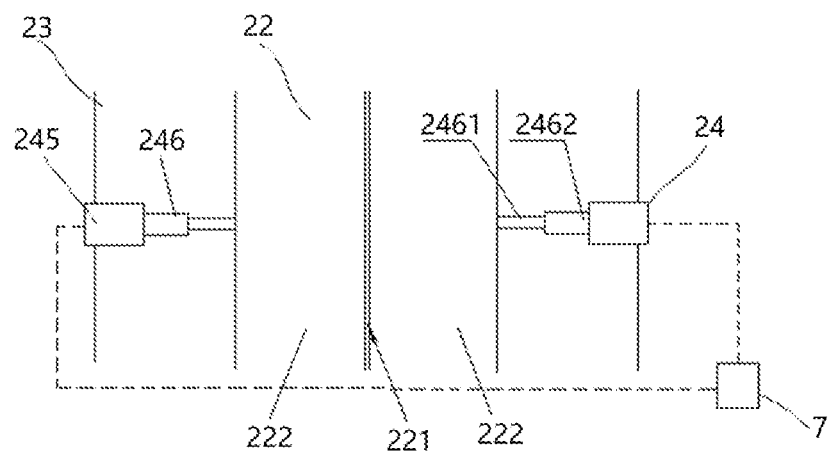
FIG. 18 is a principle schematic structural diagram of one angle of a ray emitting apparatus according to some embodiments of the present disclosure (a ray source is not shown)

The adjustment mechanism 25' in the aforementioned embodiment belongs to a manual adjustment apparatus. In some embodiments, as shown in FIG. 18, the adjustment mechanism 25' may also be an automatic adjustment apparatus. For example, the adjustment part 25 of the adjustment mechanism 25' may include a stepping motor 245 and a corresponding transmission component 246, and a control apparatus 7 in signal connection with the stepping motor 245, the stepping motor 245 is enabled to be in driving connection with the collimation plate 222 through the transmission component 246, and the size or shape of the collimation port is adjusted by driving the collimation plate 222 to act through the stepping motor 245. The stepping motor 245 is configured to act according to a control instruction sent by the control apparatus 7.

For example, the transmission component 246 may include a transmission mechanism, such as a lead screw-nut transmission mechanism and a linkage mechanism, which can convert rotation of the stepping motor into translational movement of the collimation plate 222. By controlling a rotation angle of the stepping motor 245 through the control apparatus 7, the movement of the corresponding collimation plate 222 can be controlled, so as to adjust the interval between the two collimation plates 222 and realize the adjustment of the size or shape of the collimation port 221.

In the embodiment shown in FIG. 18, the transmission component 246 is a lead screw-nut transmission mechanism, including a lead screw 2461 and a nut 2462. The lead screw 2461 is connected with the collimation plate 222, and the nut 2462 is connected with an output shaft of the stepping motor 245. The rotation of the stepping motor 245 drives the nut 464 to rotate, and the nut 2462 is in threaded fit with the lead screw 2461, which drives the lead screw 2461 to move, to drive the collimation plate 222 to move and adjusting the width of the collimation port 221.

The aforementioned control apparatus 7 may be a general processor, a programmable logic control apparatus (PLC), a digital signal processor (DSP), an application specific integrated circuit (ASIC), a field programmable gate array (FPGA) or other programmable logic devices, discrete gates or transistor logic devices, discrete hardware components or any suitable combination thereof, which are used for executing the functions described by the present disclosure.

In the embodiments shown in FIGS. 14 to 18 above, the ray emitting apparatus according to the present disclosure is only explained by taking the case that the two collimation plates oppositely form the collimation slit and the two collimation plates relatively translate to change the size of the gap as an example.

In some embodiments, as long as the structures of the collimation plates are reasonably set, the adjustment of the size or shape of the collimation port can be realized by other ways.

For example, on the basis of the embodiments shown in FIGS. 19 and 20, the two collimation plates may be staggered up and down, the adjustment mechanism is disposed (the adjustment mechanism may be disposed with reference to the previous embodiment), and then the sizes or shapes of collimation ports can be adjusted by changing am overlapping degree of the two collimation plates.

In the aforementioned embodiments, the collimation plate is a flat plate, and in some unillustrated embodiments, the collimation plate may be a curved surface plate, such as a columnar surface plate. In this case, the size or shape of the collimation port may also be adjusted by relative rotation of the two curved surface plates. If the stepping motor is used as a driving device of the corresponding collimation plate, the transmission mechanism between the stepping motor and the corresponding collimation plate may not be necessary at this time.

In some unillustrated embodiments, the size or shape of the collimation slit may also be changed by changing angles of the two collimation plates.

Compared with the ray emitting apparatus of which the ray generators and the collimators are in one-to-one correspondence in the related art, the ray emitting apparatus according to the embodiments of the present disclosure includes ray generators and one collimator corresponding to ray generators, and the one collimator can limit the ray beam shapes of the ray beams emitted by ray generators at the same time, to realize beam limiting and collimation of ray generators at the same time. Further, the shapes of the ray beams emitted by respective ray generators or part of ray generators can be adjusted simultaneously by adjusting the size or shape of the collimation port.

The radiation scanning imaging device according to the embodiment of the present disclosure includes the aforementioned ray emitting apparatus. The radiation scanning imaging device has the advantages of the aforementioned ray emitting apparatus. The radiation scanning imaging device using the ray emitting apparatus is convenient to assemble and adjust, which is beneficial to synchronously adjust a beam output range of the whole ray emitting apparatus, so as to realize multi-view angle imaging, which is favorable to ensure that beam output energy is concentrated and accurate, and to ensure an efficient image quality.

In one embodiment, in the prior art of the field of safety inspection, containers, vehicles and other objects are often inspected by radiation rays. The radiation scanning imaging device uses radiation rays to scan the object, and the detector receives the radiation rays reflected or transmitted by the object for imaging, so as to inspect the object. With the development of society, there are more and more sites needing safety inspection, and the requirements on flexible and fast transition of the radiation scanning imaging device are also higher and higher.

The objective of the present disclosure is to provide a radiation inspection system capable of fast transition.

The present disclosure discloses a radiation inspection system, which has a transportation state and a working state, and includes:
a container having an adjustable width, a width of the container in the transportation state being less than the width in the working state;
a radiation scanning imaging device disposed in the container and including a ray source and a detector, and the radiation scanning imaging device is disposed along a length direction of the container in the transportation state, and is disposed along a width direction of the container in the working state to be configured to perform radiation scanning inspection on a vehicle passing through the interior of the container along the length direction; and
a rotating device disposed in the container and configured to rotate the radiation scanning imaging device during switching of the transportation state and the working state.

In some embodiments, the container includes a bottom wall, a top wall, a left wall and a right wall which extend along the length direction, the left wall and the right wall are oppositely disposed along the width direction of the container, and the radiation scanning imaging device further includes a driving device configured to adjust a distance between the left wall and the right wall during switching of the transportation state and the working state to adjust the width of the container.

In some embodiments, the radiation inspection system further includes a first sliding part and a second sliding part which are located at two ends of the bottom wall and are respectively connected with the bottom wall in a relatively sliding way, the first sliding part is connected with the left wall, and the second sliding part is connected with the right wall; and the driving device is respectively in driving connection with the first sliding part and the second sliding part, and the driving device is configured to drive the first sliding part and the second sliding part to slide relative to the bottom wall to adjust the width of the container.

In some embodiments, the radiation inspection system includes a conveying apparatus disposed in the container, and the conveying apparatus is configured to convey the vehicle entering the container in the working state, so that the vehicle passes through a radiation inspection channel of the radiation scanning imaging device.

In some embodiments, the conveying apparatus includes a first conveyor and a second conveyor which extend along the length direction of the container, the first conveyor and the second conveyor are disposed at intervals along the width direction of the container, and the interval distance between the first conveyor and the second conveyor can be adjusted.

In some embodiments, the container includes a bottom wall, a top wall, a left wall and a right wall which extend along the length direction, the left wall and the right wall are opposite and disposed along the width direction of the container, the distance between the left wall and the right wall can be adjusted, and the container also includes a first support part and a second support part which are fixedly connected with the left wall and the right wall respectively. The radiation scanning imaging device is supported on the first support part and the second support part in the working state. The rotating device includes a rotation part and a support frame which are disposed on the container. The support frame is detachably connected between the rotation part and the radiation scanning imaging device in the transportation state, and the radiation scanning imaging device is supported on the support frame. The rotation part is configured to provide power for rotating the radiation scanning imaging device, and during switching between the transportation state and the working state, the rotation part rotates the radiation scanning imaging device through the support frame.

In some embodiments, the support frame includes follow-up support legs, and the follow-up support legs are supported on the bottom wall in the transportation state.

In some embodiments, the first support part and the second support part both include arc-shaped guide rails, and the arc-shaped guide rail includes a fixed end guide rail fixedly connected with the container and an extended end guide rail detachably connected with the fixed end guide rail. In the transportation state and the working state, the extended end guide rail is separated from the fixed end guide rail and the radiation scanning imaging device. During switching between the transportation state and the working state, the extended end guide rail is fixedly connected with the fixed end guide rail, and the fixed end guide rail and the extended end guide rail guide rotation of the radiation scanning imaging device.

In some embodiments, the radiation inspection system includes a first cabin located at the top, and a first support arm and a second support arm which support the first cabin and are located at both ends of the first cabin, and the first support arm and the second support arm are configured to be adjustable in height, so that the height of the first cabin in the transportation state is less than that in the working state.

In some embodiments, each of the first support arm and the second support arm includes a first section arm and a second section arm which can slide relatively, and the first support arm and the second support arm adjust respective heights through relative sliding of respective first section arms and second section arms.

In some embodiments, the container includes a bottom wall, a top wall, a left wall and a right wall which extend along the length direction, the left wall and the right wall are oppositely disposed along the width direction of the container, the top wall includes a relatively independent multi-section top plate, one end of the top plate corresponding to the radiation scanning imaging device is hinged with one of the left wall and the right wall, and the other end of the top plate is detachably connected with the other of the left wall and the right wall.

In some embodiments, the radiation inspection system includes a first cabin at the top, and a length of the first cabin is adjustable.

In some embodiments, the first cabin includes a first sub-cabin body, a second sub-cabin body and a third sub-cabin body, which are connected in sequence. The ray source is disposed in the second sub-cabin body, and both the first sub-cabin body and the third sub-cabin body may slide relative to the second sub-cabin body. The first cabin slides relative to the second sub-cabin body through the first sub-cabin body and/or the third sub-cabin body to adjust the length of the first cabin.

In some embodiments, container walls of the container include radiation protection walls.

Based on the radiation inspection system according to the present disclosure, by disposing the radiation scanning imaging device in the container, the transition of the radiation inspection system can be more convenient and faster. Meanwhile, by disposing the container to be adjustable in width and disposing the radiation scanning imaging device along different directions in the working state and the transportation state, the radiation scanning imaging device can meet the work requirements of normal radiation inspection in the working state, and at the same time, the radiation scanning imaging device can be more compact in the transportation state, which is convenient for transportation transition.

Other embodiments of the present disclosure will become apparent from the following detailed description of exemplary embodiments of the present disclosure with reference to the accompanying drawings.

As shown in FIGS. 1 to 13, the radiation inspection system according to the present embodiment has a transportation state and a working state, and the radiation inspection system includes a container 1, a radiation scanning imaging device 2 and a rotating device 4.

Figure 2:
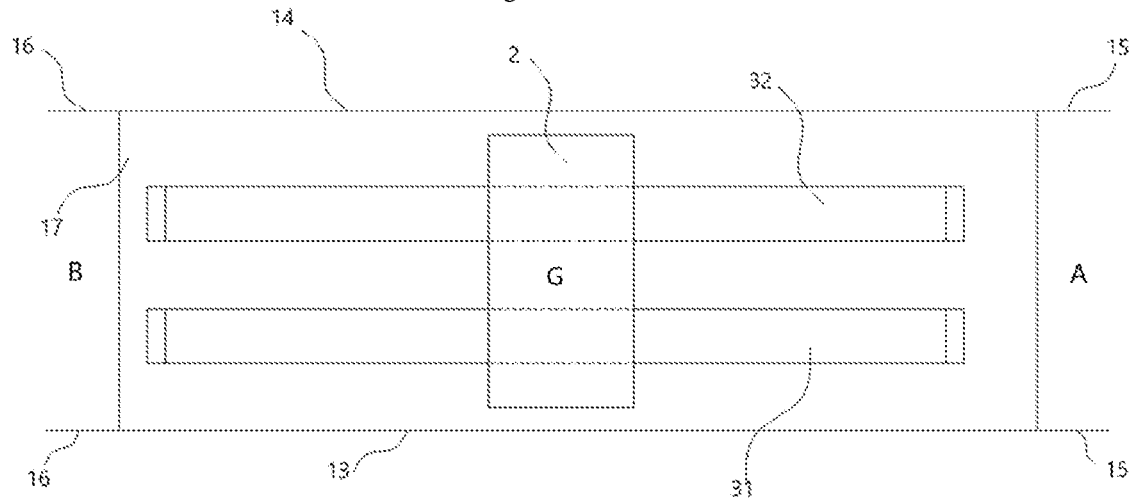
FIG. 2 is a top partial schematic structural diagram of the radiation inspection system shown in FIG. 1 in a working state.
Figure 3:
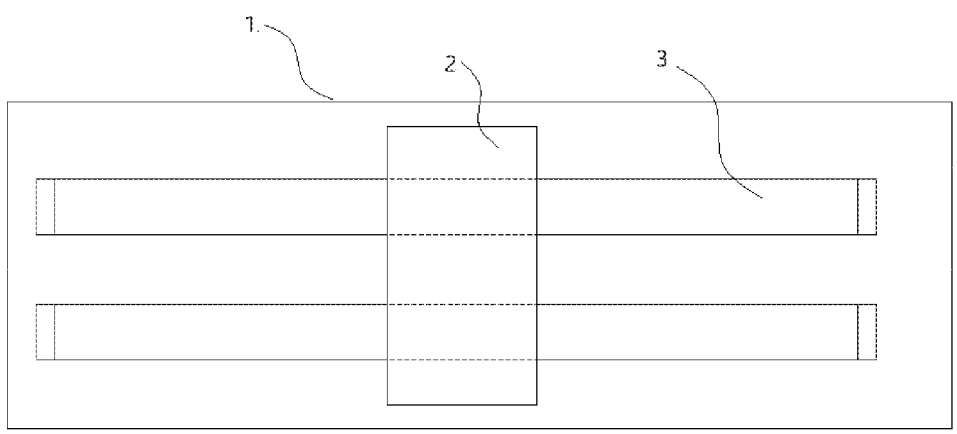
FIG. 3 is a top partial schematic structural diagram of the radiation inspection system shown in FIG. 1 in the process of switching between a working state and a transportation state.

The width of the container 1 can be adjusted. As shown in FIGS. 1 and 2, the width of the container 1 in the transportation state is less than that in the working state.

The radiation scanning imaging device 2 is disposed in the container 1. The radiation scanning imaging device 2 includes a ray source 21 and a detector 22. The radiation scanning imaging device 2 is configured to perform radiation scanning inspection on a vehicle 100 passing through the interior of the container 1. In the transportation state, as shown in FIG. 1, the radiation scanning imaging device 2 is disposed along the length direction of the container 1, that is, the length direction of the radiation scanning imaging device 2 is consistent with the length direction of the container 1. At this time, the width of the container 1 may be adjusted to be smaller, and the radiation inspection system has a more compact structure and is convenient for transportation. In the working state, as shown in FIG. 2, the width of the container 1 may be adjusted to be larger, and the radiation scanning imaging device 2 is disposed along the width direction of the container 1 to perform radiation scanning inspection on the vehicle 100 passing through the interior of the container 1 along the length direction, that is, the length direction of the radiation scanning imaging device 2 is consistent with the width direction of the container 1.

The rotating device 4 is disposed in the container 1 and is configured to rotate the radiation scanning imaging device 2 during switching of the transportation state and the working state. During switching of the transportation state and the working state, the rotating device 4 is in driving connection with the radiation scanning imaging device 2, and the radiation scanning imaging device 2 may be switched between being disposed along the length direction of the container 1 and being disposed along the width direction of the container 1 by rotating the radiation scanning imaging device 2 through the rotating device 4.

For the radiation inspection system according to the present embodiment, the radiation scanning imaging device 2 is disposed in the container 1, so that the transition of the radiation inspection system is more convenient and faster. At the same time, the width of the container 1 can be adjusted, and the radiation scanning imaging device 2 is disposed in different directions in the working state and the transportation state, so that the radiation inspection system can meet the work requirements of normal radiation inspection in the working state, and at the same time, the structure of the radiation inspection system can be more compact in the transportation state, which is convenient for transportation transition.

In some embodiments, as shown in FIGS. 1 to 5, the container 1 includes a bottom wall 17, a top wall, a left wall 13 and a right wall 14 which extend along the length direction, and the left wall 13 and the right wall 14 are opposite and disposed along the width direction of the container 1. The bottom wall 17, the top wall, the left wall 13 and the right wall 14 of the container 1 may be box plate structures of a conventional container. The radiation inspection system further includes a driving device 5 disposed on the bottom wall 17, and the driving device 5 is configured to adjust a distance between the left wall 13 and the right wall 14 during switching of the transportation state and the working state to adjust the width of the container 1.

Figure 4:
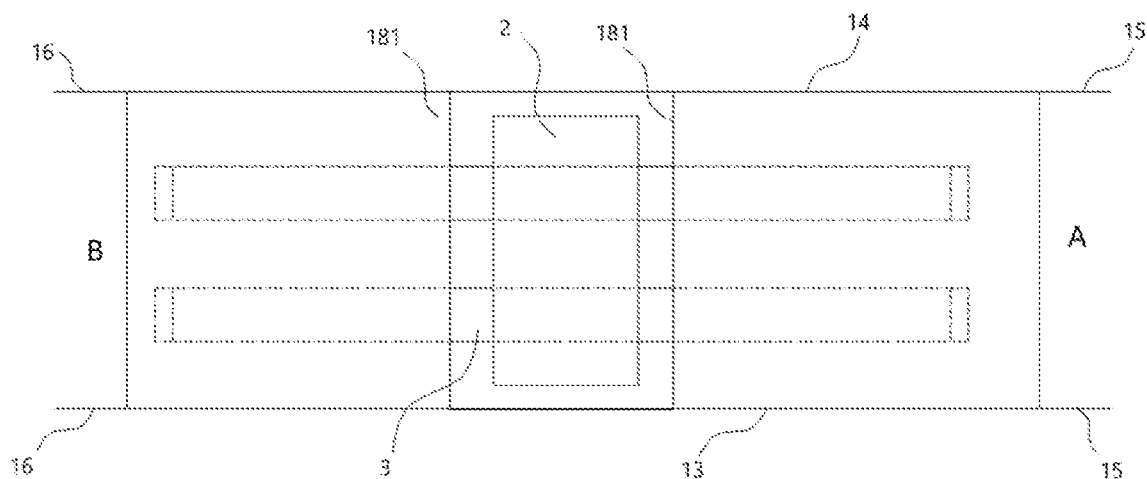
FIG. 4 is a top partial schematic structural diagram of a radiation inspection system in a working state according to some other embodiments of the present disclosure.
Figure 5:
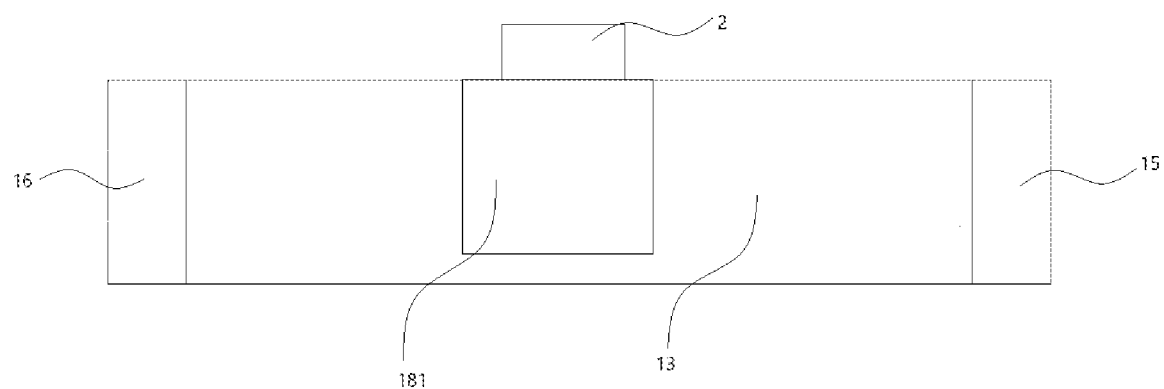
FIG. 5 is a front partial schematic structural diagram of the radiation inspection system shown in FIG. 4 in a working state.

In some embodiments, the container 1 further includes a front door 16 and a back door 15. The front door 16 is configured to close or open the container 1 from the front of the container 1, and an exit B is formed after opening the container 1. The back door 15 is configured to close or open the container 1 from the back of the container 1, and an entrance A is formed after opening the container 1. As shown in FIGS. 2, 4 and 5, the front door 16 and the back door 15 are opposite doors, that is, each of the front door 16 and the back door 15 includes a door body hinged with the left wall 13 and a door body hinged with the right wall 14. In the transportation state, both door bodies of the front door 16 and the back door 15 are closed, to close the container 1. In the working state, both door bodies of the front door 16 and the back door 15 are open, so that the vehicle 100 can enter the container 1 through the back door 15 and leave the container 1 from the front door of the container 1 after radiation scanning inspection. In some embodiments not shown in the figures, each of the front door 16 and the back door 15 may include only one door body hinged with the left wall 13 or the right wall 14, and the container 1 is opened and closed by the rotation of one door body.

Figure 6:
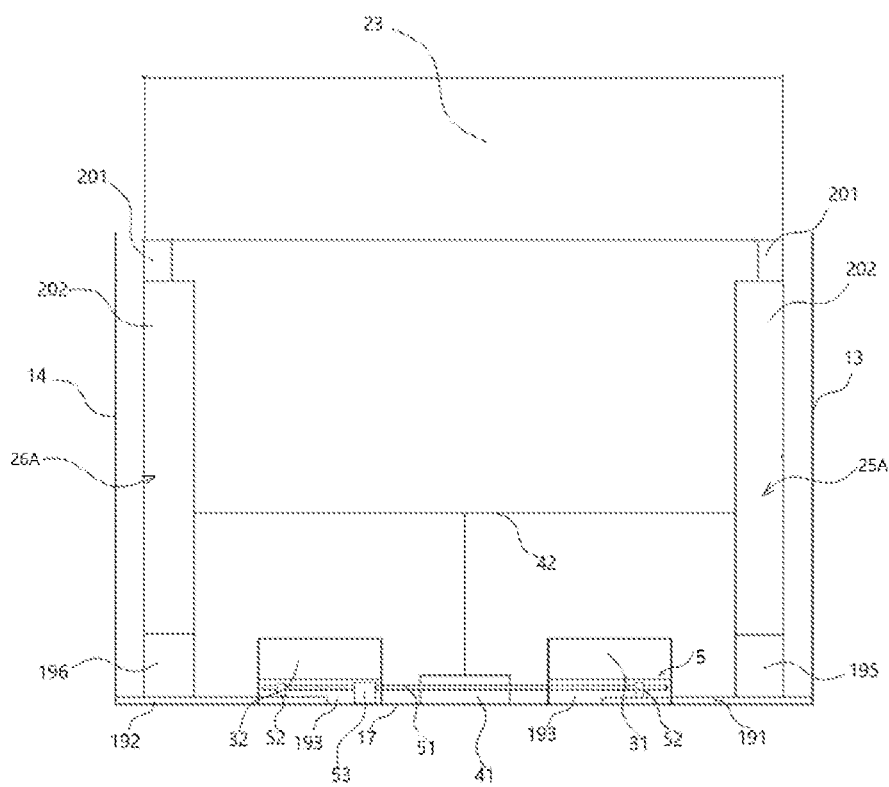
FIG. 6 is a left partial schematic structural diagram of a radiation inspection system in the process of switching between a working state and a transportation state according to still other embodiments of the present disclosure.
Figure 7:
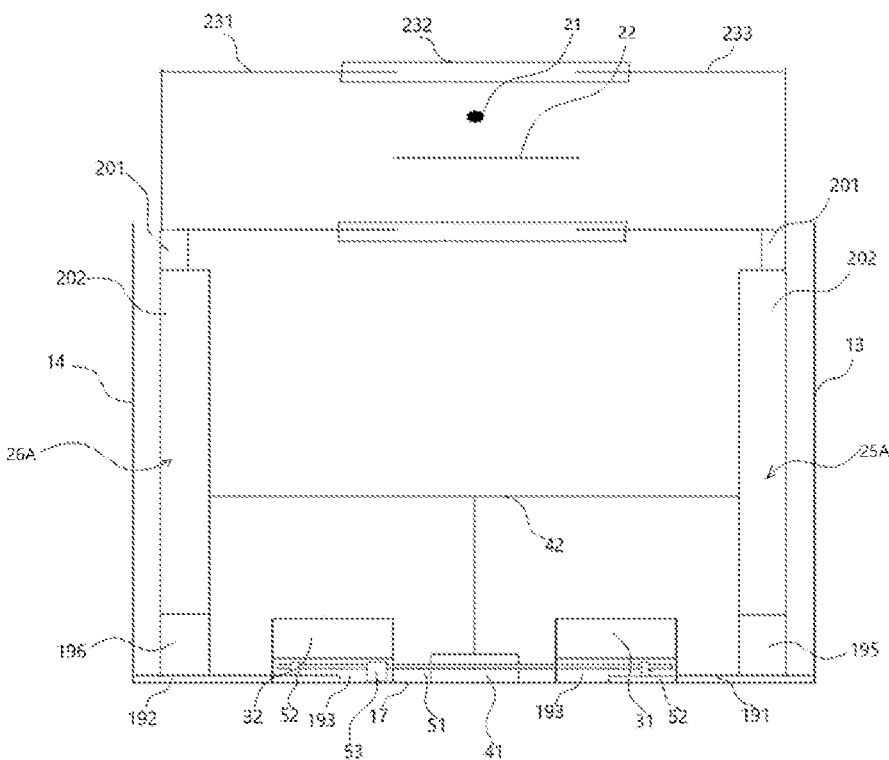
FIG. 7 is a left partial schematic structural diagram of a radiation inspection system in the process of switching between a working state and a transportation state according to still other embodiments of the present disclosure.
Figure 10:
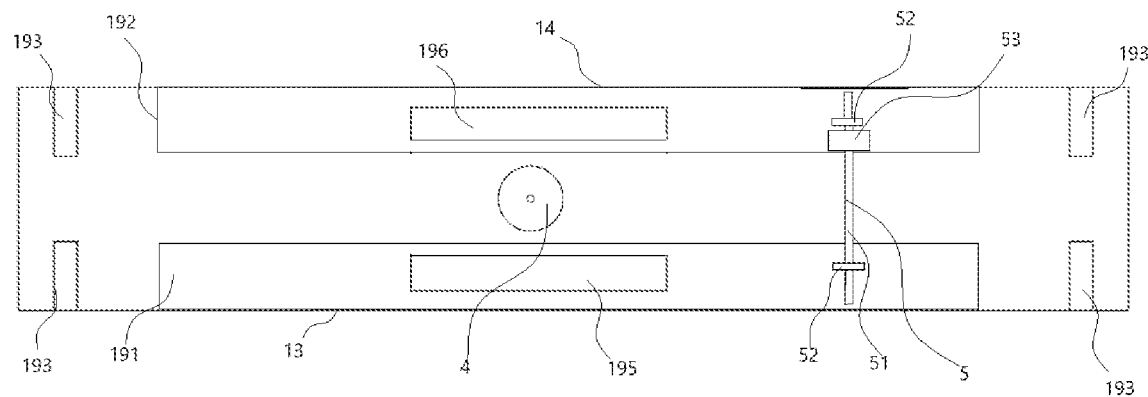
FIG. 10 is a top partial schematic structural diagram of a radiation inspection system in a transportation state according to still other embodiments of the present disclosure.

In some embodiments, as shown in FIGS. 6, 7 and 10, the radiation inspection system further includes a first sliding part 191 and a second sliding part 192 which are located at both ends of the bottom wall 17 and are respectively connected with the bottom wall 17 in a relatively sliding way. The first sliding part 191 is connected with the left wall 13, the second sliding part 192 is connected with the right wall 14, and the driving device 5 is respectively in driving connection with the first sliding part 191 and the second sliding part 192. The driving device 5 is configured to drive the first sliding part 191 and the second sliding part 192 to slide relative to the bottom wall 17 so as to adjust the width of the container 1.

The driving device 5 drives the first sliding part 191 and the second sliding part 192 to move, that is, drives the left wall 13 connected with the first sliding part 191 and the right wall 14 connected with the second sliding part 192 to move, to adjust the distance between the left wall 13 and the right wall 14.

The first sliding part 191 may be a plate body fixedly connected with the left wall 13, and the second sliding part 192 may be a plate body fixedly connected with the right wall 14. The first sliding part 191 may be disposed to overlap the bottom wall 17, and relative sliding between the first sliding part 191 and the bottom wall 17 is realized by driving the first sliding part 191 to overcome a sliding frictional force between the first sliding part 191 and the bottom wall 17 through the driving device 5. A guide rail may also be disposed between the first sliding part 191 and the bottom wall 17, and the relative sliding between the first sliding part 191 and the bottom wall 17 can be realized by sliding the guide rail. The structural relationship between the second sliding part 192 and the bottom wall 17 may refer to the first sliding part 191.

In the embodiments shown in FIGS. 6, 7 and 10, the driving device 5 includes a driving motor 53, a lead screw 51 driven to rotate by the driving motor, and two nuts 52 in threaded fit with the lead screw 51, and one nut 52 is fixedly connected with the first sliding part 191 and the other nut 52 is fixedly connected with the second sliding part 192. The driving motor 53 drives the lead screw 51 to rotate, and the rotation of the lead screw 51 can drive the two nuts to approach or move away from each other, so that the first sliding part 191 and the second sliding part 192 can be driven to slide relative to the bottom wall 17 through the action of a lead screw-nut pair, to adjust the distance between the left wall 13 and the right wall 14.

In some embodiments not shown in the figures, the driving device 5 includes a first driving oil cylinder in driving connection with the first sliding part 191 and a second driving oil cylinder in driving connection with the second sliding part 192. The first sliding part 191 and the second sliding part 192 can be driven to slide relative to the bottom wall 17 by expansion and contraction of the first driving oil cylinder and the second driving oil cylinder.

In some embodiments, as shown in FIGS. 1 to 4 and 6 to 7, the radiation inspection system includes a conveying apparatus 3 disposed in the container 1, and the conveying apparatus 3 is configured to convey the vehicle 100 entering the container 1 in the working state, so that the vehicle 100 passes through a radiation inspection channel of the radiation scanning imaging device 2.

By disposing the conveying apparatus 3, when the vehicle 100 is inspected in the working state, it is only necessary to drive the vehicle 100 to the entrance of the container 1, and then a driver can leave. The conveying apparatus 3 may automatically convey the vehicle 100 to pass through the radiation inspection channel of the radiation scanning imaging device 2, so as to realize the automation of radiation scanning inspection and reduce radiation to the driver. In some embodiments, the conveying apparatus 3 includes a conveying mechanism such as a plate chain conveyor and a roller conveyor.

In some embodiments, as shown in FIGS. 1 to 8, the conveying apparatus 3 includes a first conveyor 31 and a second conveyor 32 which extend along the length direction of the container 1, the first conveyor 31 and the second conveyor 32 are disposed at intervals along the width direction of the container 1, and the interval distance between the first conveyor 31 and the second conveyor 32 can be adjusted.

In the present embodiment, the interval distance between the first conveyor 31 and the second conveyor 32 may be adjusted for the vehicles 100 of different widths, so that the conveying apparatus conveys the vehicles 100 of different widths more smoothly and appropriately. In some embodiments, the first conveyor 31 and the second conveyor 32 may be conveying mechanisms such as plate chain conveyors and roller conveyors.

In the embodiments shown in FIGS. 6 to 9, the first conveyor 31 and the second conveyor 32 are disposed on a conveying apparatus support structure 193, and the conveying apparatus support structure 193 includes two support blocks respectively located on the left and right sides in front of the container 1 and two support blocks respectively located on the left and right sides in the back of the container 1. After the conveying apparatus support structure 193 is disposed, the driving device 5, the first sliding part 191, the second sliding part 192 and other structures of the above embodiment may be disposed below the first conveyor 31 and the second conveyor 32, which avoids the interference between the above structures and the conveying apparatus 3.

In some embodiments, as shown in FIGS. 6 to 13, the container 1 includes a bottom wall 17, a top wall, a left wall 13 and a right wall 14 which extend along the length direction, the left wall 13 and the right wall 14 are oppositely disposed along the width direction of the container 1, and the distance between the left wall 13 and the right wall 14 can be adjusted. The container 1 further includes a first support part 195 and a second support part 196 which are fixedly connected with the left wall 13 and the right wall 14 respectively. In the working state, the radiation scanning imaging device 2 is supported on the first support part 195 and the second support part 196. The rotating device 4 includes a rotation part 41 and a support frame 42 which are disposed on the container 1. In the transportation state, the support frame 42 is detachably connected between the rotation part 41 and the radiation scanning imaging device 2, and the radiation scanning imaging device 2 is supported on the support frame 42. The rotation part 41 is configured to provide power for rotating the radiation scanning imaging device 2, and rotate the radiation scanning imaging device 2 through the support frame 42 during switching between the transportation state and the working state.

The first support part 195 and the left wall 13 may be fixedly connected by direct connection, or as shown in FIG. 10, the first support part 195 is fixedly connected with the first sliding part 191, and the first sliding part 191 is fixedly connected with the left wall 13. The first support part 195 is indirectly connected with the left wall 13 to realize fixed connection, and the fixed connection between the second support part 196 and the right wall 14 is the same.

In the transportation state, the support frame 42 is in driving connection with the rotation part 41, and the radiation scanning imaging device 2 is supported on the support frame 42. During switching from the transportation state to the working state, the rotation part 41 drives the support frame 42 to rotate, and the support frame 42 drives the radiation scanning imaging device 2 to rotate. When the radiation scanning imaging device 2 is rotated to the state that two ends are respectively supported by the first support part 195 and the second support part 196, since the support frame 42 is detachably connected with the rotation part 41 and the radiation scanning imaging device 2, the support frame 42 can be detached at this time, which avoids the interference from the support frame 42 to the vehicle 100 during the radiation scanning inspection when the vehicle 100 is conveyed by the conveying apparatus for inspection.

During switching from the working state to the transportation state, the support frame 42 may be installed between the rotation part 41 and the radiation scanning imaging device 2, and then the radiation scanning imaging device 2 is rotated to be along the length direction of the container 1 and supported on the support frame 42 by rotating the support frame 42 through the rotation part 41. The support frame 42 may be a T-shaped structure. For example, the support frame 42 may include a support plate located at the top and a support rod located below the support plate and fixedly connected with the support plate. The support plate is configured to be detachably connected with the radiation scanning imaging device 2, and the support rod is detachably connected with the rotation part 41. The shape of the support plate may be set according to the need of supporting the radiation scanning imaging device 2, for example, the support plate may be set as a rectangular plate, or may be set as a circular plate as shown in FIG. 8, and a cross-sectional shape of the support rod is, for example, circular.

Figure 8:
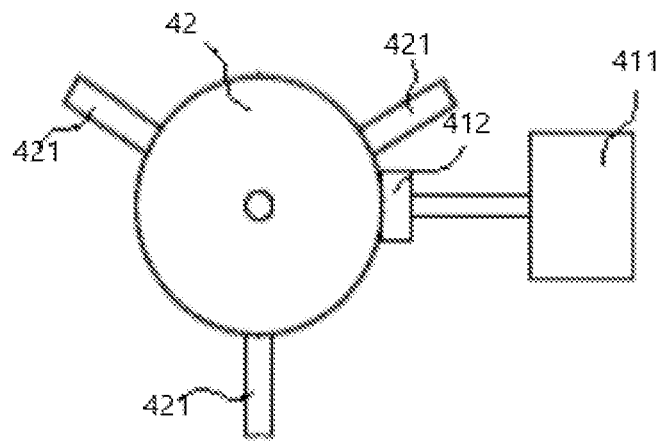
FIG. 8 is a partial schematic structural diagram of a rotating device of a radiation inspection system according to still other embodiments of the present disclosure.

In some embodiments, as shown in FIG. 8, the support frame 42 includes follow-up support legs 421, and the follow-up support legs 421 are supported on the bottom wall 17 in the transportation state. During switching from the transportation state to the working state, the rotation part 41 rotates the support frame 42, the support frame 42 drives the radiation scanning imaging device 2 to rotate, and the follow-up support legs 421 of the support frame 42 also rotate on the bottom wall 17. In some embodiments, the follow-up support leg 421 includes a support leg column and a universal wheel disposed at the tail end of the support leg column. The follow-up support legs 421 are disposed to help the support frame 42 to support the radiation scanning imaging device 2 more stably.

In some embodiments, as shown in FIG. 8, the rotating device 4 includes a rotation motor 411 and a transmission apparatus 412 connected with the rotation motor 411. The rotation motor 411 drives the rotation part 41 to rotate through the transmission apparatus 412. The transmission apparatus 412 is, for example, a gear transmission apparatus, and may include a first gear of which the rotation axis is parallel to that of the rotation part 41, and the first gear is driven by the rotation motor 411 to rotate. The rotation part 41 is a second gear meshed with the first gear, and a diameter of the second gear may be larger than that of the first gear. In the transportation state, the rotation part 41 is fixedly connected with the support frame 42.

In some embodiments not shown in the figures, the rotating device 4 may also include a hydraulic driving device such as a rotary oil cylinder and a rotary motor.

Figure 11:
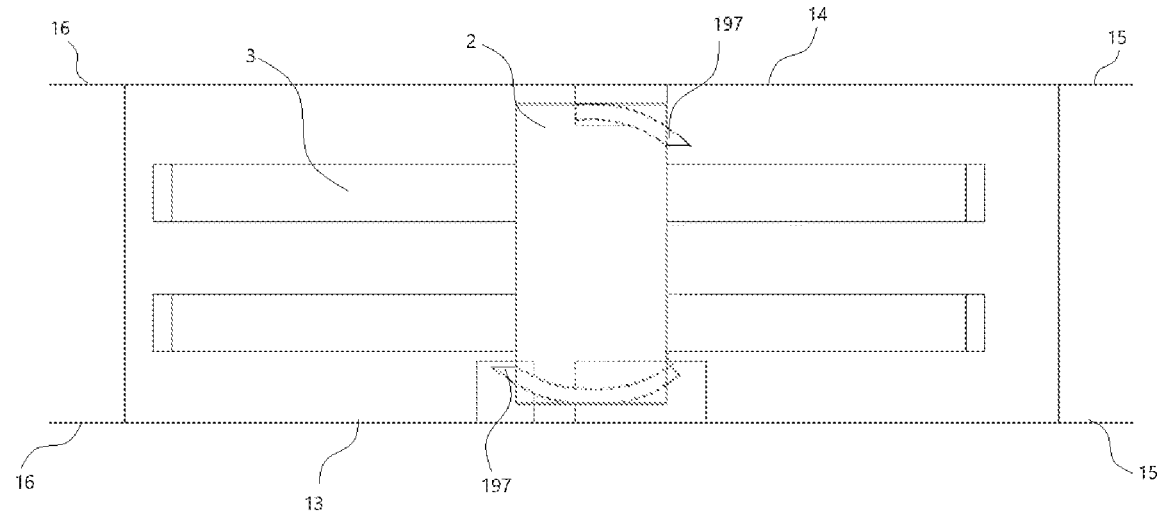
FIG. 11 is a top partial schematic structural diagram of a radiation inspection system in a working state according to still other embodiments of the present disclosure.
Figure 12:
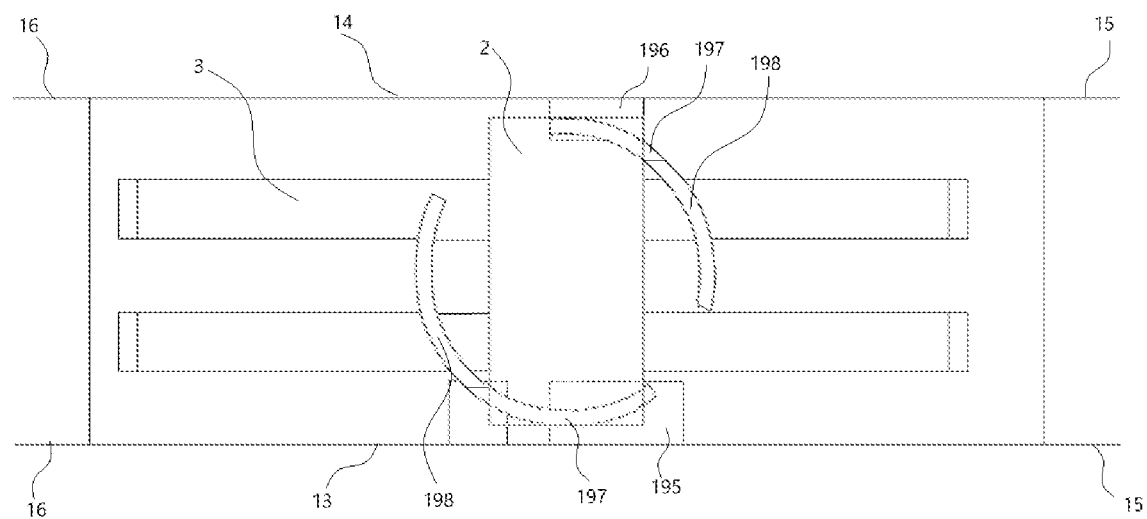
FIG. 12 is a top partial schematic structural diagram of the radiation inspection system shown in FIG. 11 in the process of switching from a working state to a transportation state.
Figure 13:
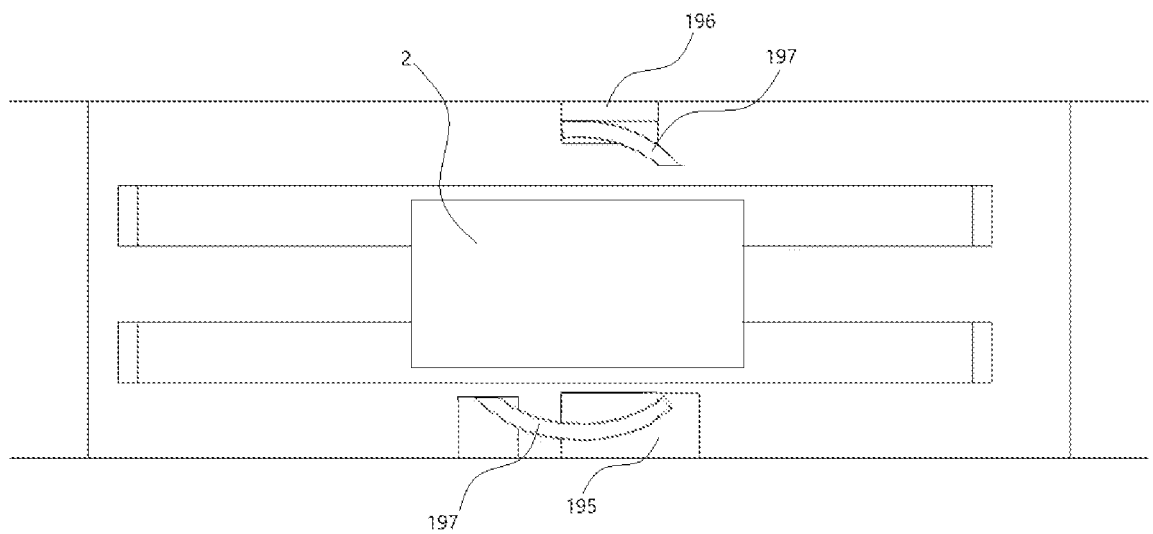
FIG. 13 is a top partial schematic structural diagram of the radiation inspection system shown in FIG. 11 in the process of switching from a working state to a transportation state.

In some embodiments, as shown in FIGS. 11 to 13, both the first support part 195 and the second support part 196 include arc-shaped guide rails, and the arc-shaped guide rail include a fixed-end guide rail 197 fixedly connected with the container 1 and an extended-end guide rail 198 detachably connected with the fixed-end guide rail 197. The extended-end guide rail 198 is separated from the fixed-end guide rail 197 and the radiation scanning imaging device 2 in the transportation state and the working state. During switching between the transportation state and the working state, the extended end guide rail 198 is fixedly connected with the fixed end guide rail 197. The fixed end guide rail 197 and the extended end guide rail 198 guide rotation of the radiation scanning imaging device 2.

The fixed end guide rail 197 is always fixedly connected with the container 1. As shown in FIG. 11, during switching between the working state and the transportation state, the fixed end guide rail 197 is connected with the extended end guide rail 198. The bottom of the radiation scanning imaging device 2 is provided with sliders, and the radiation scanning imaging device 2 is connected with the arc-shaped guide rails through the sliders, so that the radiation scanning imaging device 2 can slide on the arc-shaped guide rails through the sliders when rotating. The arc-shaped guide rails guide rotation of the radiation scanning imaging device 2. As shown in FIG. 12, after switching from the transportation state to the working state, the extended end guide rails 198 may be removed to avoid interference between the extended end guide rails 198 and the inspected vehicle 100 when the radiation scanning imaging device 2 performs inspection work. The radiation scanning imaging device 2 is supported on the fixed end guide rails 197 at both ends.

As shown in FIG. 13, during switching from the working state to the transportation state, the radiation scanning imaging device 2 rotates to be along the length direction of the container 1, the extended end guide rails 198 may be removed, and then the distance between the left wall 13 and the right wall 14 can be reduced to reduce the width of the container 1. The extended end guide rails 198 can be removed to avoid interference with the container 1 or other moving components during adjustment of the width of the container 1.

In some embodiments, one end of the top wall is hinged with the left wall 13, and the other end of the top wall is detachably connected with the right wall 14. When it is necessary to open the top of the container 1, the top wall may be turned to the outside of the left wall 13 by separating the top wall from the right wall 14.

Figure 9:
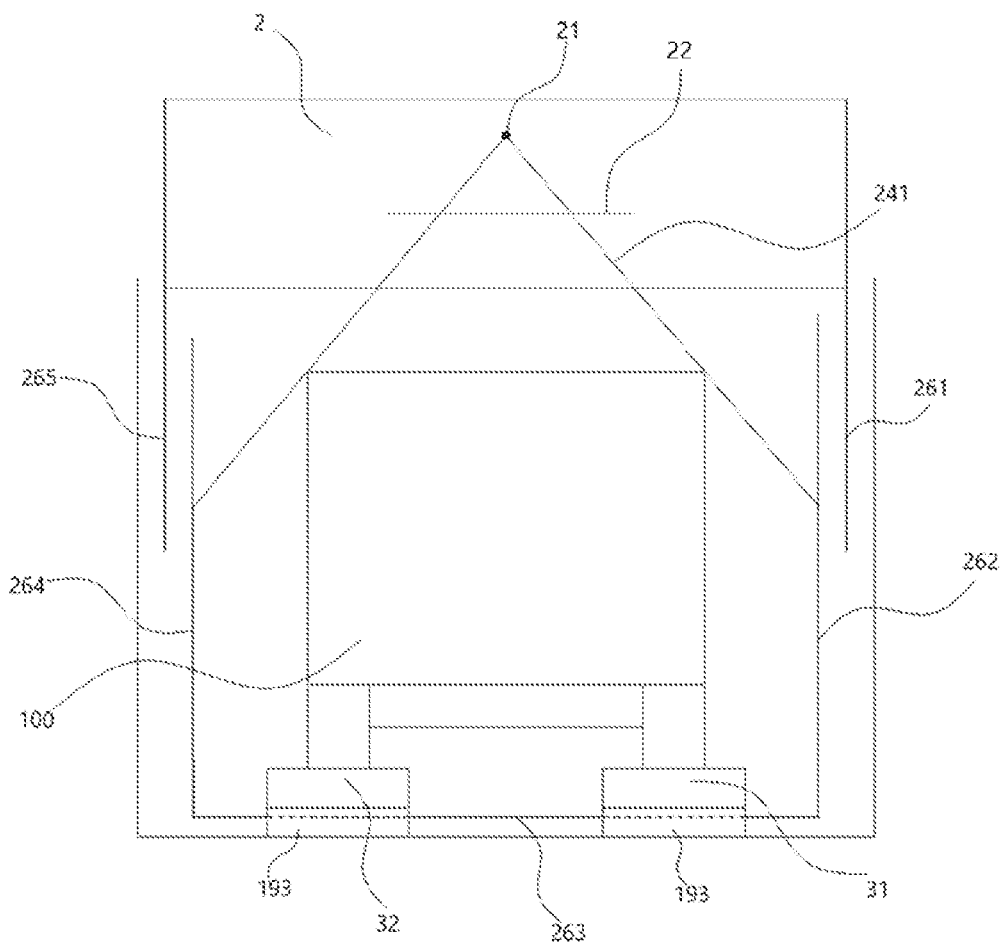
FIG. 9 is a left partial schematic structural diagram of a radiation inspection system in a working state according to still other embodiments of the present disclosure.

In some embodiments, as shown in FIGS. 6, 7 and 9, the radiation scanning imaging device 2 includes a first cabin 23 at the top and a first support arm 25A and a second support arm 26A which support the first cabin 23 and are located at both ends of the first cabin 23, and heights of the first support arm 25A and the second support arm 26A can be adjusted. In the present embodiment, by adjusting the heights of the first support arm 25A and the second support arm 26A, the height of the radiation inspection channel performing radiation scanning inspection on the vehicle 100 under the radiation scanning imaging device 2 can be adjusted.

In some embodiments, as shown in FIGS. 6 and 7, each of the first support arm 25A and the second support arm 26A includes a first section arm 201 and a second section arm 202 which can slide relatively, and the first support arm 25A and the second support arm 26A adjust respective heights by the relative sliding of respective first section arms 201 and second section arm 202. An oil cylinder may be disposed between the first section arm 201 and the second section arm 202. A cylinder barrel of the oil cylinder is fixedly connected with one of the first section arm 201 and the second section arm 202, and a piston rod of the oil cylinder is fixedly connected with the other of the first section arm 201 and the second section arm 202. The height of the first support arm 25A or the second support arm 26A can be adjusted through expansion and contraction of the oil cylinder.

In some embodiments, as shown in FIGS. 4 and 5, the container 1 includes a bottom wall 17, a top wall, a left wall 13 and a right wall 14 which extend along the length direction. The left wall 13 and the right wall 14 are oppositely disposed along the width direction of the container 1, and the top wall includes a relatively independent multi-section top plate 181. One end of the top plate 181 corresponding to the radiation scanning imaging device 2 is hinged with one of the left wall 13 and the right wall 14, and the other end of the top plate 181 is detachably connected with the other of the left wall 13 and the right wall 14.

In the embodiments shown in FIGS. 4 and 5, one end of the top plate 181 corresponding to the radiation scanning imaging device 2 is hinged with the left wall 13. When it is necessary to lift the radiation scanning imaging device 2 to make the radiation scanning imaging device 2 extend out of the container 1, the top of the container 1 corresponding to the radiation scanning imaging device 2 can be opened by turning the top plate 181 corresponding to the radiation scanning imaging device 2 over, so that the radiation scanning imaging device 2 can normally extend out.

In some embodiments, as shown in FIG. 7, the radiation scanning imaging device 2 includes a first cabin 23 at the top, and the length of the first cabin 23 can be adjusted. Due to such arrangement, the width of the inspection channel G of the radiation scanning imaging device 2 can be adjusted, so that the vehicles 100 of various widths can be inspected.

In some embodiments, as shown in FIG. 7, the first cabin 23 includes a first sub-cabin body 231, a second sub-cabin body 232 and a third sub-cabin body 233 which are connected in sequence. The ray source 21 is disposed in the second sub-cabin body 232. Both the first sub-cabin body 231 and the third sub-cabin body 233 can slide relative to the second sub-cabin body 232. The first cabin 23 slides relative to the second sub-cabin body 232 through the first sub-cabin body 231 and/or the third sub-cabin body 233 to adjust the length of the first cabin 23. Due to such arrangement, the length of the first cabin 23 can be adjusted. Since the ray source 21 is disposed in the second sub-cabin body 232, the position of the ray source 21 located in the middle of the first cabin 23 can be kept basically stable, which is favorable to maintain functional stability of the radiation scanning imaging device 2.

In some embodiments, the first cabin is also internally provided with a collimator 22 configured to collimate radiation rays 241 emitted by the ray source 21.

In some embodiments, as shown in FIG. 9 (FIG. 9 omits the structures such as the first support arm 25A and the second support arm 26A, and only schematically shows the structural arrangement of the detector), the detector includes a first detection arm 261 disposed on the first section arm of the first support arm 25A, a second detection arm 262 disposed on the second section arm of the first support arm 25A, a third detection arm 263 disposed on the bottom wall 17 of the container 1, a fourth detection arm 264 disposed on the second section arm of the second support arm 26A and a fifth detection arm disposed on the first section arm of the second detection arm 26A.

In some embodiments, all the container walls of the container 1 include radiation protection walls.

On yet another aspect, in the radiation inspection system taking the radiation imaging technology as a safety detection means, the transmission efficiency of large objects to be inspected, such as vehicles and containers, is one of the main factors affecting the working efficiency of the radiation inspection system.

The radiation inspection system according to the present disclosure includes a conveying apparatus configured to convey an object to be inspected from one end to the other end of an inspection channel, and the conveying apparatus includes:

at least one conveyor configured to transport the object to be inspected, and the conveyor includes a self-traveling device, a carrying apparatus and a wheel pitch self-adaptive adjustment apparatus, the carrying apparatus is disposed on the self-traveling device, and the wheel pitch self-adaptive adjustment apparatus is in driving connection with the self-traveling device and configured to adjust a wheel pitch of the self-traveling device;

a sensor configured to measure width information of the object to be inspected; and a control apparatus which is in signal connection with the sensor and the wheel pitch self-adaptive adjustment apparatus and configured to calculate a target wheel pitch of the self-traveling device according to the width information detected by the sensor and control the wheel pitch self-adaptive adjustment apparatus to adjust the wheel pitch of the self-traveling device to the target wheel pitch.

In some embodiments, the self-traveling device includes a first walking part and a second walking part which are disposed at intervals along a transverse direction, and the transverse direction is consistent with the width direction of the container;

the carrying apparatus includes a first carrying part and a second carrying part which are disposed at intervals along the transverse direction, the first carrying part is disposed on the first walking part, and the second carrying part is disposed on the second walking part;

the wheel pitch self-adaptive adjustment apparatus is configured to adjust the distance between the first carrying part and the second carrying part along the transverse direction of the conveyor to adjust the distance between the first walking part and the second walking part along the transverse direction, so as to adjust the wheel pitch of the self-traveling device.

In some embodiments, the wheel pitch self-adaptive adjustment apparatus includes:

a driving unit disposed on the first carrying part;

a transmission unit including a first transmission part and a second transmission part, and the first transmission part is in driving connection with the driving unit, the second transmission part is disposed on the second carrying part and is in driving connection with the first transmission part, and the transmission unit is configured to convert the movement of an output part of the driving unit into relative movement of the first carrying part and the second carrying part through the first transmission part and the second transmission part, so as to adjust the distance between the first carrying part and the second carrying part along the transverse direction.

In some embodiments,
the first transmission part includes a screw rod, and the screw rod is in driving connection with the driving unit to rotate under driving of the driving unit; and
the second transmission part includes a nut, and the nut is disposed on the second carrying part and is in threaded fit with the screw rod.

In some embodiments, the wheel pitch self-adaptive adjustment apparatus further includes a guide unit configured to limit the relative movement of the first carrying part and the second carrying part along the transverse direction.

In some embodiments, the guide unit includes:
a guide rail disposed on one of the first carrying part and the second carrying part along the transverse direction; and
a guide member disposed on the other of the first carrying part and the second carrying part and movably matched with the guide rail along the guide rail.

In some embodiments,
the conveyor also includes a navigation apparatus;
the conveying apparatus further includes a movement guide apparatus, and the navigation apparatus, in some embodiments,
the conveyor also includes an electric energy storage apparatus; and
the conveying apparatus also includes a charging apparatus and/or a battery replacement apparatus.

In some embodiments, the conveying apparatus further includes an object handling device and the object handling device is configured to unload the object to be inspected from the conveyor and load the object to be inspected onto the conveyor.

In some embodiments, the conveyor is an automatic guided vehicle.

In some embodiments, the at least one conveyor includes:
a first conveyor, and the sensor is disposed on the first conveyor; and
a second conveyor configured to receive and continuously convey the object to be inspected on the first conveyor.

In some embodiments, the control apparatus includes:
a first instruction signal transceiving apparatus, which is in signal connection with the sensor and the wheel pitch self-adaptive adjustment apparatus of the first conveyor;
a second instruction signal transceiving apparatus, which is in signal connection with the wheel pitch self-adaptive adjustment apparatus of the second conveyor; and
an instruction signal transceiving processing apparatus, which is in signal connection with the first instruction signal transceiving apparatus and the second instruction signal transceiving apparatus, and is configured to calculate the target wheel pitch according to the width information of the object to be inspected detected by the sensor, control the wheel pitch self-adaptive adjustment apparatus of the first conveyor to adjust the wheel pitch of the first self-traveling device to the target wheel pitch through the first instruction signal transceiving apparatus, and control the wheel pitch self-adaptive adjustment apparatus of the second conveyor to adjust the wheel pitch of the self-traveling device to the target wheel pitch through the second instruction signal transceiving apparatus. In some embodiments, the carrying apparatus includes a conveying apparatus, and a conveying direction of the conveying apparatus is disposed along a longitudinal direction of the conveyor.

In some embodiments, the conveyor includes universal wheels disposed at the bottom of the carrying apparatus for adjusting the wheel pitch of the self-traveling device.

Based on the radiation inspection system according to the present disclosure, the conveying apparatus and the radiation inspection system operate compactly and are quickly deployed during radiation inspection. The wheel pitch of the conveying apparatus can be automatically adjusted according to the width information of the inspected object, which is suitable for the radiation inspection system to inspect various inspected objects of different specifications.

Other embodiments of the present disclosure will become apparent from the following detailed description of exemplary embodiments of the present disclosure with reference to the accompanying drawings.

FIGS. 21 to 29 show the conveying apparatus 3 in the radiation inspection system according to the embodiment of the present disclosure.

As shown in FIGS. 21 to 28, the conveying apparatus includes at least one conveyor, a sensor S and a control apparatus 7.

Figure 22:
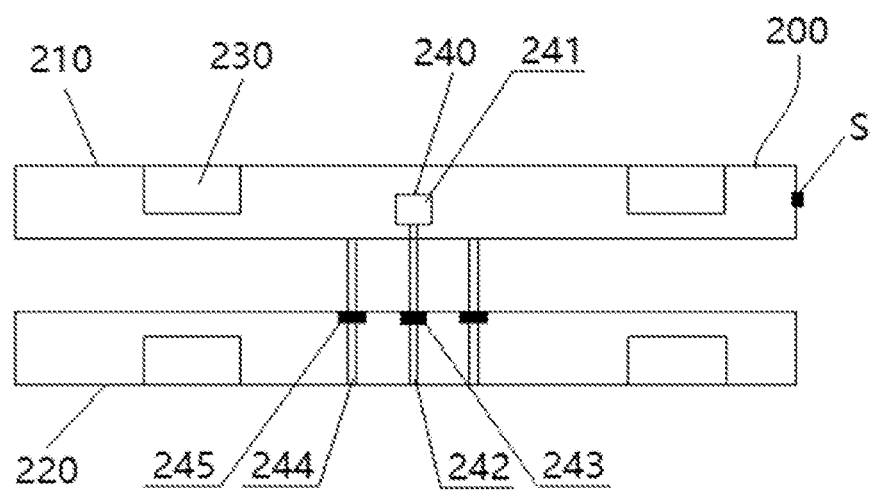
FIG. 22 is a principle schematic diagram of an automatic conveyor according to some embodiments of the present disclosure.

The conveyor is configured to transport the object to be inspected. FIG. 22 shows the main structure of the conveyor with the first conveyor 200 as an example. In some embodiments, the main structure of the second conveyor 300 is basically the same as that of the first conveyor 200, and the description is not repeated here.

As shown in FIG. 22, the conveyor (first conveyor 200) includes a self-traveling device 230, a carrying apparatus, and a wheel pitch self-adaptive adjustment apparatus 240. The carrying apparatus is disposed on the self-traveling device 230, and the wheel pitch self-adaptive adjustment apparatus 240 is in driving connection with the self-traveling device 230 and is configured to adjust the wheel pitch of the self-traveling device 230. The sensor S is configured to measure width information of the object to be inspected. The sensor S may be, for example, a photoelectric sensor S or an integrated sensing apparatus including a laser device, a proximity switch, etc.

The control apparatus 7 is in signal connection with the sensor S and the wheel pitch self-adaptive adjustment apparatus 240, and is configured to calculate a target wheel pitch of the self-traveling device 230 according to the width information detected by the sensor S and control the wheel pitch self-adaptive adjustment apparatus 240 to adjust the wheel pitch of the self-traveling device 230 to the target wheel pitch.

As shown in FIG. 22, the self-traveling device 230 of the conveyor includes a first walking part and a second walking part which are disposed at intervals along the transverse direction; the carrying apparatus of the conveyor includes a first carrying part 210 and a second carrying part 220 which are disposed at intervals along the transverse direction, the first carrying part 210 is disposed on the first walking part, and the second carrying part 220 is disposed on the second walking part. The wheel pitch self-adaptive adjustment apparatus 240 is configured to adjust the distance between the first carrying part 210 and the second carrying part 220 along the transverse direction of the conveyor, so as to adjust the distance between the first walking part and the second walking part along the transverse direction, to adjust the wheel pitch of the self-traveling device 230.

In FIG. 22, the self-traveling device 230 mainly includes two wheels on the left side of the conveyor 200 and two wheels on the right side of the conveyor 200. The first walking part includes two wheels on the left side of the conveyor (two wheels on the upper side in FIG. 22), and the first carrying part 210 is disposed on the two wheels on the left side of the conveyor. The second walking part includes two wheels on the right side (two wheels on the lower side in FIG. 22), and the second carrying part is disposed on the two wheels on the right side of the conveyor.

As shown in FIG. 22, the wheel pitch self-adaptive adjustment apparatus 240 includes a driving unit and a transmission unit. The driving unit is disposed on the first carrying part 210. The transmission unit includes a first transmission part and a second transmission part. The first transmission part is in driving connection with the driving unit, the second transmission part is disposed on the second carrying part 220 and in driving connection with the first transmission part, and the transmission unit is configured to convert the movement of an output part of the driving unit into relative movement of the first carrying part 210 and the second carrying part 220 through the first transmission part and the second transmission part, so as to adjust the distance between the first carrying part 210 and the second carrying part 220 along the transverse direction.

As shown in FIG. 22, in these embodiments, the first transmission part includes a screw rod 242, and the screw rod 242 is in driving connection with the driving unit to rotate under driving of the driving unit; the second transmission part includes a nut 243, and the nut 243 is disposed on the second carrying part 220 and in threaded fit with the screw rod 242.

In some embodiments, the driving unit includes a rotation motor 241. In an unillustrated embodiment, the driving unit may also be a driving device in other forms, such as a linear motor and a hydraulic motor.

The transmission unit may be a transmission apparatus in other forms, such as a gear-rack apparatus and a crank-connection rod apparatus.

As shown in FIG. 22, in some embodiments, the wheel pitch self-adaptive adjustment apparatus 240 further includes a guide unit configured to limit relative movement of the first carrying part 210 and the second carrying part 220 along the transverse direction.

As shown in FIG. 22, in some embodiments, the guide unit includes a guide rail 244 and a guide member 245. The guide rail 244 is disposed on one of the first carrying part 210 and the second carrying part 220 along the transverse direction. The guide member 245 is disposed on the other of the first carrying part 210 and the second carrying part 220 and movably matched with the guide rail 244 along the guide rail 244. The guide 245 may be, for example, a slider, a roller, etc.

FIG. 22 shows an embodiment of one driving unit and one corresponding group of screw rod-nut transmission units. In an unillustrated embodiment, more driving units and corresponding transmission units may be disposed, or one driving unit may be disposed to drive transmission units for wheel pitch adjustment.

FIG. 22 shows an embodiment of the wheel pitch self-adaptive adjustment apparatus 240 with two guide units. In an unillustrated embodiment, the wheel pitch self-adaptive adjustment apparatus may include only one guide unit or three or more guide units.

Figure 23:
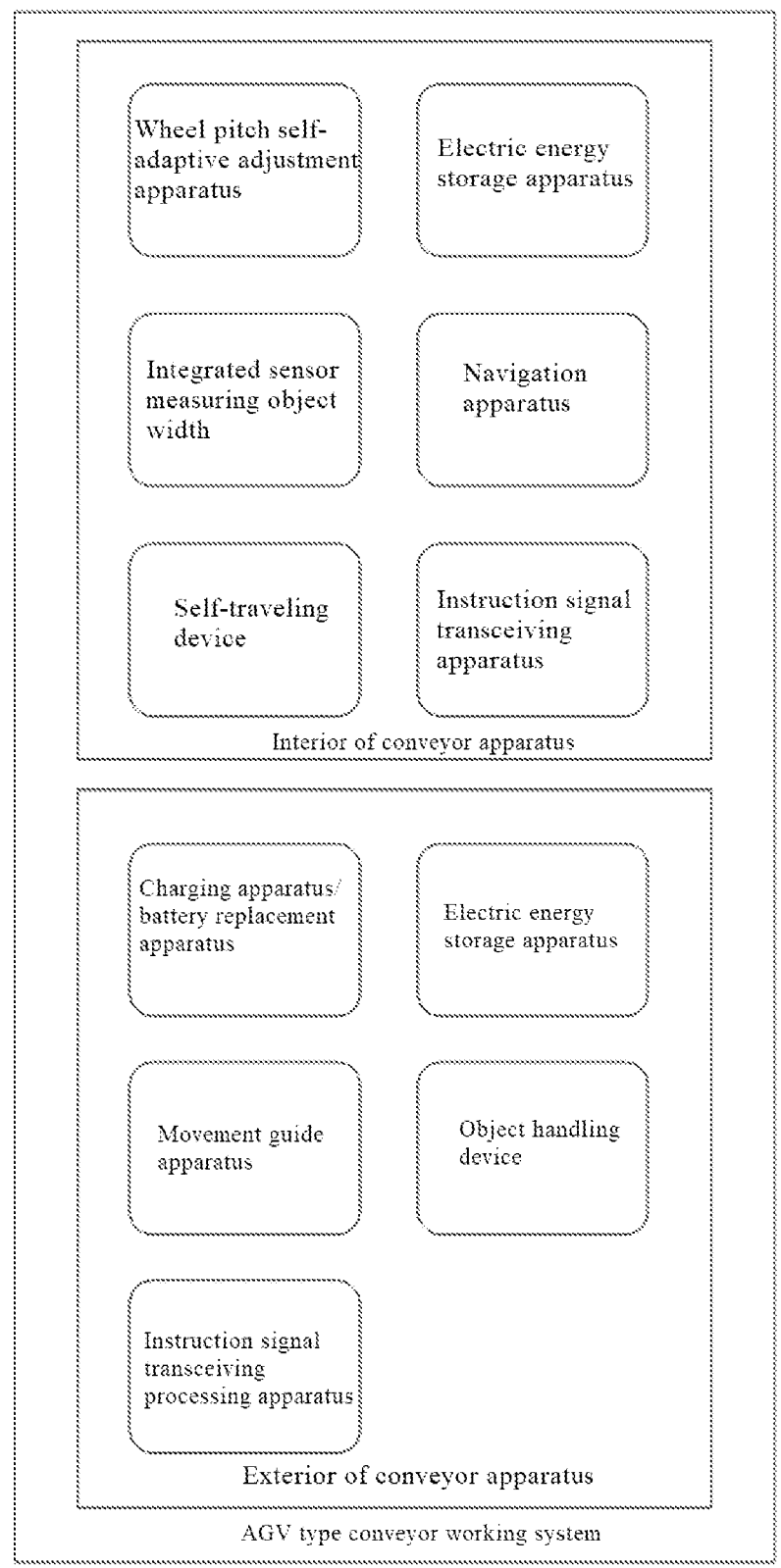
FIG. 23 is a constitution schematic block diagram of a conveying apparatus according to some embodiments of the present disclosure.

In some embodiments, the conveyor may be disposed as an automated guided vehicle (AGV). As shown in FIG. 23, in some embodiments, the conveying apparatus is configured as an AGV type conveyor working system.

As shown in FIG. 23, the conveyor also includes a navigation apparatus. The navigation apparatus may be an electromagnetic or optical automatic navigation apparatus, and a traveling path and behaviors of the conveyor may be controlled by the control apparatus 7, so that the conveyor can travel along a specified navigation path.

The conveying apparatus 3 may further include a movement guide apparatus, and the navigation apparatus controls movement of the conveyor according to a movement path provided by the movement guide apparatus. For example, the movement guide apparatus may include an electromagnetic track to set up the traveling path of the conveyor, the electromagnetic track may be disposed on the ground, and the conveyor moves and acts depending on information brought by the electromagnetic track.

As shown in FIG. 23, the conveyor further includes an electric energy storage apparatus. The conveying apparatus 5 further includes a charging apparatus and/or a battery replacement apparatus. An electric energy storage device for conveyor replacement may be included outside the conveyor. When the electric energy storage apparatus of the conveyor is about to run out of power, an instruction will be sent to the control apparatus 7 to request charging, and after permission of the control apparatus 7, the conveyor will automatically reach the charging apparatus for charging or reach the battery replacement apparatus for replacing the electric energy storage apparatus.

As shown in FIG. 23, the conveying apparatus 3 further includes an object handling device, and the object handling device is configured to unload the object to be inspected from the conveyor and load the object to be inspected onto the conveyor. The object handling device includes, for example, a mechanical arm, a conveyor of which a conveying part can be lifted or not, and the like.

As shown in FIGS. 21 and 24 to 28, in some embodiments, the conveying apparatus 3 includes a first conveyor 200 and a second conveyor 300. The sensor S is disposed on the first conveyor 200. The second conveyor 300 is configured to receive and continue to transport the object to be inspected on the first conveyor 200. By disposing the first conveyor 200 and the second conveyor 300 at the same time, the efficiency of transferring the inspected object by the conveying apparatus can be improved.

As shown in FIG. 23, the control apparatus 7 includes an instruction signal transceiving apparatus and an instruction signal transceiving processing apparatus which are disposed on the conveyor. For the conveying apparatus 3 including two conveyors, the control apparatus 7 includes an instruction signal transceiving apparatus corresponding to the first conveyor, an instruction signal transceiving apparatus corresponding to the second conveyor and an instruction signal transceiving processing apparatus. The first instruction signal transceiving apparatus is in signal connection with the sensor S and the wheel pitch self-adaptive adjustment apparatus 240 of the first conveyor 200. The second instruction signal transceiving apparatus is in signal connection with the wheel pitch self-adaptive adjustment apparatus of the second conveyor 300. The instruction signal transceiving processing apparatus is in signal connection with the first instruction signal transceiving apparatus and the second instruction signal transceiving apparatus. The instruction signal transceiving processing apparatus is configured to calculate the target wheel pitch according to the width information of the object to be inspected detected by the sensor S, control the wheel pitch self-adaptive adjustment apparatus 240 of the first conveyor 200 to adjust the wheel pitch of the first self-traveling device 230 to the target wheel pitch through the first instruction signal transceiving apparatus, and control the wheel pitch self-adaptive adjustment apparatus of the second conveyor 300 to adjust the wheel pitch of the self-traveling device to the target wheel pitch through the second instruction signal transceiving apparatus.

In some embodiments, the control apparatus described above may be implemented as a general processor, a programmable logic controller (PLC), a digital signal processor (DSP), an application specific integrated circuit (ASIC), a field-programmable gate array (FPGA) or other programmable logic devices, discrete gates or transistor logic devices, discrete hardware components or any suitable combination thereof, which are used for executing the functions described in the present disclosure.

As shown in FIGS. 21 to 28, the radiation inspection system according to the embodiment of the present disclosure includes a radiation scanning imaging device 2 and a conveying apparatus. The radiation scanning imaging device 2 includes a ray source 21, a detector 120, and an inspection channel G. The conveying apparatus 3 is the conveying apparatus according to the aforementioned embodiment, and the conveying apparatus 3 is configured to convey the object to be inspected from an input end (corresponding to the right end of the inspection channel in FIGS. 21 and 24 to 28) to an output end (corresponding to the left end of the inspection channel in FIGS. 21 and 24 to 28) of the inspection channel G. The radiation scanning imaging device 2 of the radiation inspection system according to the embodiment shown in FIGS. 21 and 24 to 28 is a transmissive imaging device. The ray source 21 emits a scanning ray beam K, and the detector 26 receives the transmitted rays passing through the object to be inspected for imaging. In an unillustrated embodiment, the radiation scanning imaging device 2 of the radiation inspection system may be a backscattering imaging device.

The conveying apparatus 3 applied to the radiation inspection system according to the present disclosure can transport vehicles, containers and other objects.

As shown in FIG. 23, in some embodiments, the interior of the conveyor of the conveying apparatus 3 is equipped with the self-traveling device 230, the carrying apparatus, the wheel pitch self-adaptive adjustment apparatus 240, the electric energy storage apparatus, the sensor S for measuring the width information of the object to be inspected (for example, measuring the wheel pitch of the vehicle, the width information of the container, etc.), the navigation apparatus, and the instruction signal transceiving apparatus. The exterior of the conveyor is equipped with the charging apparatus or the battery replacement apparatus (and the electric energy storage apparatus for replacement), the movement guide apparatus, the instruction transceiving processing apparatus and the object handling device.

In some embodiments, the carrying apparatus includes a conveying apparatus, and a conveying direction of the conveying apparatus is set along the longitudinal direction of the conveyor. For example, the first conveying part and the second conveying part of the carrying apparatus may be plate chain conveying apparatuses or roller conveying apparatuses respectively. The carrying apparatus includes the conveying apparatus, which is beneficial to handover of the object to be inspected between different conveyors and to receiving or conveying of the object to be inspected.

In some embodiments, the conveyor includes universal wheels disposed at the bottom of the carrying apparatus for adjusting the wheel pitch of the self-traveling device. The universal wheels are disposed at the bottom of the carrying apparatus, which is beneficial to wheel pitch adjustment of the self-traveling device of the conveyor.

In the following description, by taking the vehicle C to be inspected as an example of the object to be inspected, the radiation inspection process of the radiation inspection system according to some embodiments of the present disclosure will be described in detail in combination with FIGS. 21 to 29.

As shown in FIGS. 21 and 24 to 28, the conveying apparatus 3 includes two conveyors, namely a first conveyor 200 located on the right side of FIGS. 21 and 24 to 28 and a second conveyor 300 located on the left side of FIGS. 21 and 24 to 28. The first conveyor 200 serves as an input end conveyor of the input end of the inspection channel G, and the second conveyor 300 serves as an output end conveyor of the output end of the inspection channel G. In the present embodiment, both the first conveyor 200 and the second conveyor 300 are automatic guided vehicles. The driving units of the wheel pitch self-adaptive adjustment apparatuses of the first conveyor 200 and the second conveyor 300 are both motors.

Figure 24:
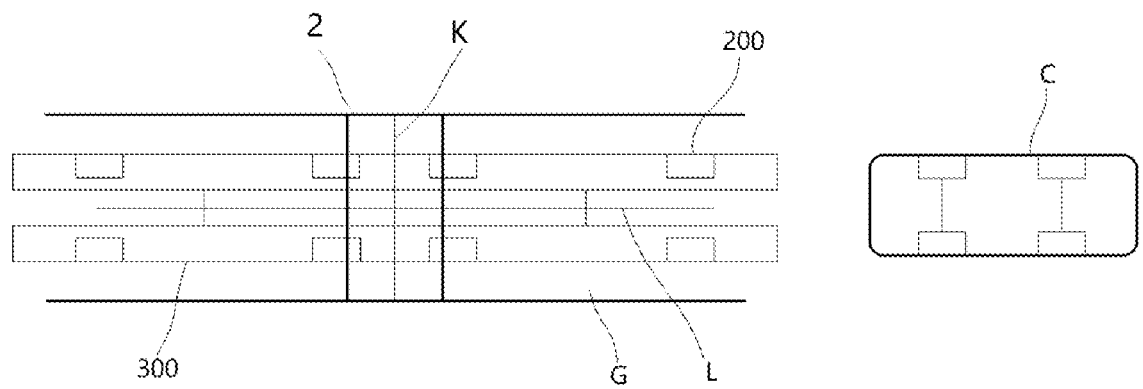
FIGS. 24 to 28 are schematic diagrams of the operation process of a conveying apparatus when a radiation inspection system inspects an object to be inspected according to some embodiments of the present disclosure.
Figure 29:
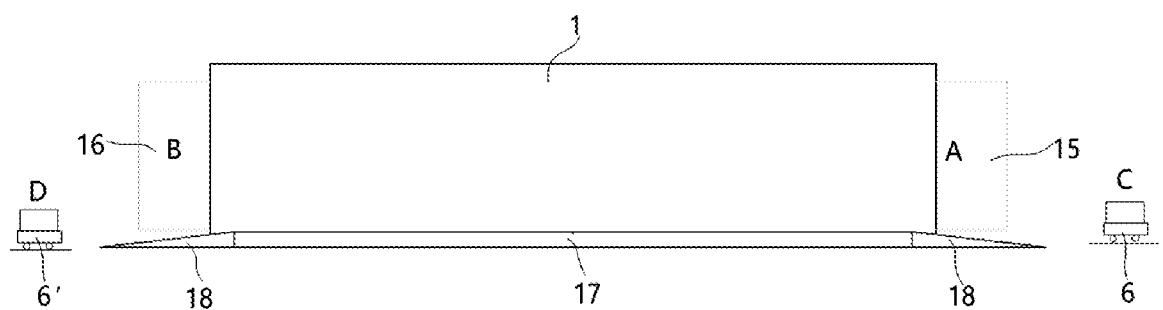
FIG. 29 is a schematic structural diagram of a radiation inspection system according to some embodiments of the present disclosure.
Figure 30:
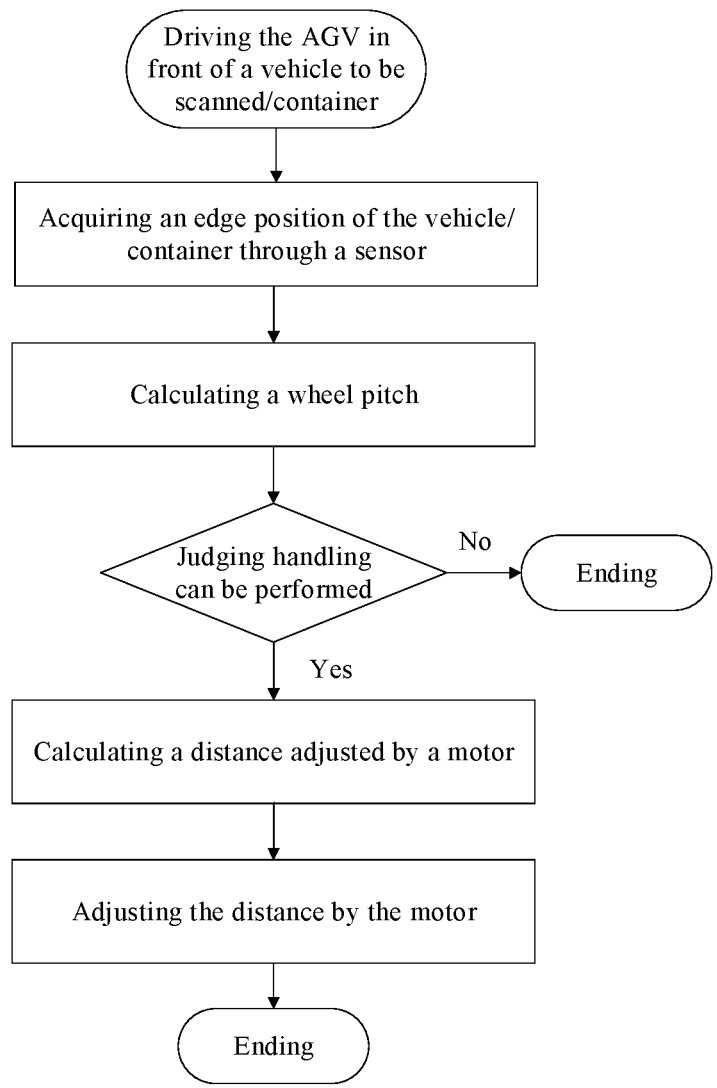
FIG. 30 discloses a flowchart of wheel pitch adjustment of a conveyor according to some embodiments.

In combination with FIG. 30, the wheel pitch adjustment flowchart of the conveyors in some embodiments is disclosed. As shown in FIG. 24, the first conveyor 200 firstly walks to the waiting position at a far end of the radiation scanning imaging device 2 to wait for the vehicle C to be inspected. At this time, the first conveyor 200 ensures that the electric energy of the electric energy storage apparatus thereof can enable the first conveyor 200 to return to the input end of the radiation scanning imaging device 2, or reach the charging apparatus for charging or the battery replacement apparatus for replacing a battery. When the vehicle C to be inspected is driven by the driver or transported to the waiting position by a handling device, the sensor S on the first conveyor 200 automatically measures a front wheel pitch of the vehicle C to be inspected (as the width information of the object to be inspected) and sends to the instruction signal transceiving apparatus of the first conveyor 200. The instruction signal transceiving processing apparatus of the control apparatus 7 calculates the target wheel pitch according to the front wheel pitch of the vehicle C to be inspected, controls the wheel pitch self-adaptive adjustment apparatus of the first conveyor 200 to automatically adjust the wheel pitch of the conveyor to the target wheel pitch, and at the same time sends the wheel pitch to the instruction signal transceiving apparatus of the second conveyor 300. The wheel pitch control process of the first conveyor 200 is as shown in FIG. 29. The vehicle C to be inspected is driven by the driver or transported to a designated position on the first conveyor 200 by the device, and the driver gets off and leaves the waiting position. With the handling device, the handling device continues to handle the next vehicle.

Figure 25:
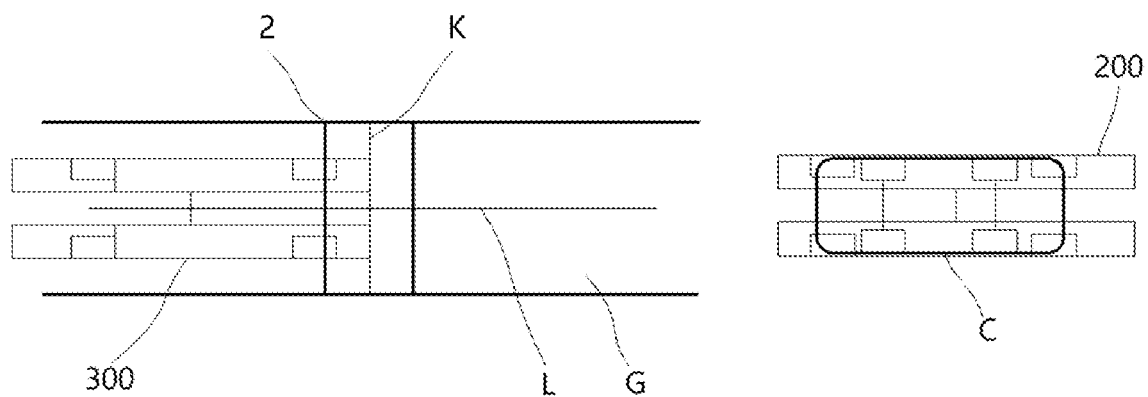

As shown in FIG. 25, the first conveyor 200 starts to carry and drive the vehicle C to be inspected to the input end of the inspection channel G of the radiation scanning imaging device 2. If necessary, the first conveyor 200 can carry the vehicle to the designated position for charging or replacing the battery, and then drive the vehicle to the input end of the radiation scanning imaging device 2. The second conveyor 300 adjusts the wheel pitch according to the target wheel pitch, and the radiation scanning imaging device 2 enters the working state. If the radiation scanning imaging device 2 is working, the first conveyor 200 enters a waiting area to wait.

Figure 26:
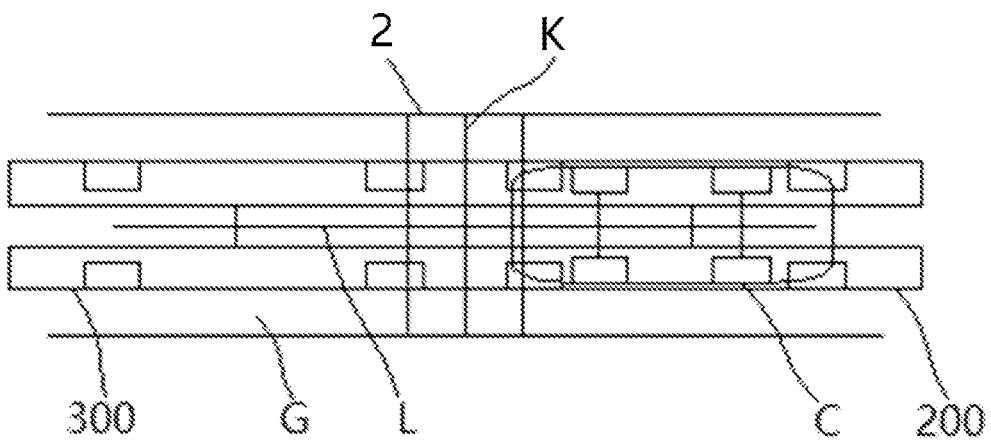

As shown in FIG. 26, after the radiation scanning imaging device 2 completes warm-up or the previous object to be inspected completes the inspection, the control apparatus 7 controls the first conveyor 200 to carry the vehicle to be inspected into the inspection channel G, and drive the vehicle to the output end of the inspection channel G along the center line L of the inspection channel G in the inspection channel G. The inspected vehicle in the inspection channel G is scanned when transported to the scanning range of a radiation ray beam B by the first conveyor 200, and enters the second conveyor 300 at an appropriate position. The first conveyor 200 unloading the inspected vehicle C leaves the radiation scanning imaging device 2 and continues to convey the next vehicle C to be inspected according to an instruction of the control apparatus 7.

Figure 27:
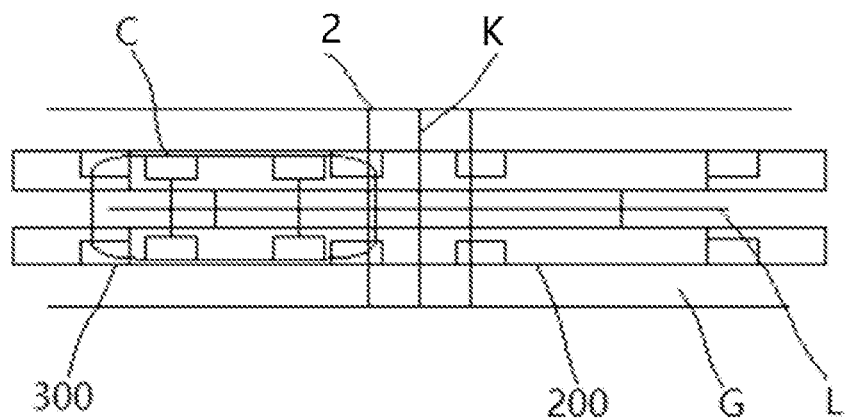
Figure 28:
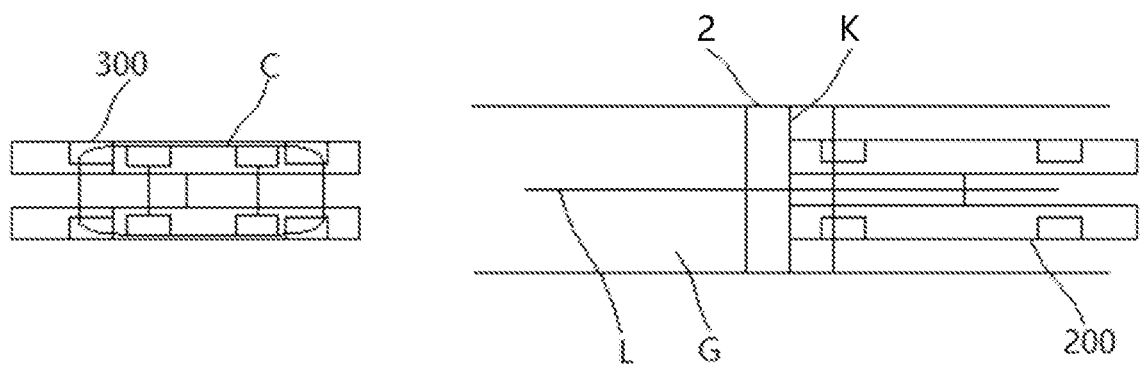

As shown in FIGS. 27 and 28, the second conveyor 300 outputs the vehicle C to be inspected out of the inspection channel G to the designated position according to the instruction of the control apparatus 7, and the vehicle to be inspected is moved to the ground by the driver or handling device. Afterwards, the second conveyor 300 returns to the inspection channel G of the radiation scanning imaging device 2, waiting to convey the next vehicle C to be inspected.

Through the conveying apparatus 3, the vehicle C to be inspected is directly conveyed from the input end to the output end of the inspection channel G. During the conveying, the radiation ray beam B emitted by the ray source 21 of the radiation scanning imaging device 2 scans the vehicle C to be inspected, and the detector 120 detects the rays passing through the vehicle C to be inspected. In one embodiment, for the backscattering radiation scanning device, the detector detects the reflected rays of the vehicle C to be inspected.

The radiation inspection system according to the embodiment of the present disclosure adopts a set of radiation scanning imaging device 2 equipped with the conveying apparatus 3 with two conveyors, which can improve conveying efficiency of the conveying apparatus 3, to improve the inspection efficiency of the radiation inspection system.

In addition, the radiation inspection system according to the present disclosure may also use a set of radiation scanning imaging device equipped with the conveying apparatus 3 with one conveyor.

In one embodiment, the radiation inspection system according to the present disclosure may be equipped with one set of radiation scanning imaging device with three or more conveyors, or more than two sets of radiation scanning imaging devices with one or more conveyors, so as to form an efficient circulation system for the inspected object and improve the working efficiency of the radiation inspection system.

The conveying apparatus and the conveyor of the radiation inspection system according to the embodiments of the present disclosure may automatically walk to the designated position according to navigation or other guide modes. The conveyor may be provided with electric energy by means such as wired charging, wireless charging and battery replacement. Each of the wired charging and wireless charging may be equipped with a corresponding charging apparatus, the charging apparatus may be disposed on, near or at the far end of the radiation scanning imaging device. Battery replacement may be performed manually or automatically by a device.

The conveyor can automatically measure the width information of the object to be inspected through the sensor S, and automatically adjust the wheel pitch of the conveyor so as to adapt to the object for convenient passing and stopping at the designated position.

The conveyor has a self-propelled function and a conveying function. When adopting the automatic guided vehicle, the conveyor may automatically navigate the conveyor carrying the inspected object to the designated position from the far end of the radiation scanning imaging device. As shown in FIGS. 24 to 28, two AGV type conveyors are matched. During radiation inspection, the first conveyor 200 on the right carries the object to be inspected to enable the same to walk to the designated position and then automatically conveys the object to be inspected to the second conveyor 300 on the left. After receiving the object to be inspected, the second conveyor 300 automatically walks to the designated position and outputs the object to be inspected.

According to the above descriptions, it can be known that the conveying apparatus and the radiation inspection system according to the embodiments of the present disclosure have the following effects: the conveying apparatus and the radiation inspection system operate compactly and are quickly deployed during radiation inspection. The wheel pitch of the conveying apparatus can be automatically adjusted according to the width information of the inspected object, which is suitable for the radiation inspection system to inspect various inspected objects of different specifications, and can reduce the influence of radiation on the drivers, passengers and staff.

As shown in FIG. 29, the container 1 further includes a ramp 18 and the bottom wall 17 extending along the length direction. The ramp 18 is rotatably connected with the bottom wall 17 of the container 1 and is disposed at least one of the entrance A and the exit B to switch between an unfolded state and a folded state. In the unfolded state, the ramp 18 is open and configured to take the object to be inspected in and out of the container 1. After the radiation inspection system is used, the ramp 18 is retracted inward to reduce occupation of an extra space. For example, the ramp 18 may be retracted to be perpendicular, parallel or at other angles to the bottom wall 17.

Since the bottom wall 17 has a given thickness, when inspection is needed, the object to be inspected may smoothly enter the container 1 through guidance of the ramp 18, and after the inspection, the ramp 18 is retracted, which can reduce the overall occupied space of the radiation inspection system and facilitate the transition.

In some embodiments, as shown in FIG. 29, the radiation inspection system further includes a first automatic guided transport vehicle 6 configured to transport the object to be inspected from a first target position C outside the container 1 to a position close to the entrance A, and/or the radiation inspection system further includes a second automatic guided transport vehicle 6' configured to move the object to be inspected from a position close to the exit B to a second target position D outside the container 1. The first automatic guided transport vehicle 6 and the second automatic guided transport vehicle 6' may be different automatic guided transport vehicles, which can improve the circulation efficiency of the object to be inspected, especially when the inspection tasks are intensive; or the first automatic guided vehicle 6 and the second automatic guided vehicle 6' may be the same automatic guided vehicle, so as to improve the utilization rate of the automatic guided vehicle and save the cost.

Finally, it should be explained that the above embodiments are only used for illustrating instead of limiting the embodiments of the present disclosure; although the present disclosure has been described in detail with reference to the embodiments, the specific embodiments of the present disclosure can still be modified or some features can be equivalently replaced; without departing from the spirit of the embodiments of the present disclosure, they should be included in the scope of the embodiments claimed by the present disclosure.

What is claimed is:

1. A radiation inspection system, comprising:
a container, respectively provided with an entrance and an exit on opposite side walls thereof along a length direction; and
a radiation scanning imaging device disposed in the container and having an inspection channel, wherein the radiation scanning imaging device comprises a ray source, the ray source comprises a plurality of ray generators, and the plurality of ray generators are configured to emit ray beams at different angles, wherein the radiation scanning imaging device performs radiation scanning inspection on an object to be inspected passing through the inspection channel from the entrance to the exit;
wherein the radiation inspection system has a transportation state and a working state, a width of the container is adjustable, and the width of the container in the transportation state is less than the width in the working state;
the radiation inspection system further comprises a rotating device disposed in the container and configured to rotate the radiation scanning imaging devices during switching of the transportation state and the working state;
wherein in the transportation state, the radiation scanning imaging device is disposed along the length direction of the container, and in the working state, the radiation scanning imaging device is disposed along a width direction of the container to perform radiation scanning inspection on the object to be inspected.

2. The radiation inspection system according to claim 1, wherein the plurality of ray generators are configured to alternately turn on and emit the ray beams along with movement of the object to be inspected.

3. The radiation inspection system according to claim 1, wherein the radiation scanning imaging device further comprises a collimator disposed at a beam output side of the plurality of ray generators and configured to simultaneously limit ray beam shapes of the ray beams output by the plurality of ray generators.

4. The radiation inspection system according to claim 3, wherein,
the collimator comprises a collimation port, and the collimation port is configured to simultaneously limit the ray beam shapes of the ray beams output by the plurality of ray generators; or
the collimator comprises more than two collimation ports, the plurality of ray generators are disposed in one-to-one correspondence with the more than two collimation ports, and each collimation port is configured to limit the ray beam shape of the ray beam output by the corresponding ray generator; or
the collimator comprises more than two collimation ports, the plurality of ray generators are grouped and disposed corresponding to the more than two collimation ports, and each collimation port is configured to simultaneously limit the ray beam shapes of the ray beams output by respective ray generators in one corresponding group of ray generators.

5. The radiation inspection system according to claim 3, wherein the collimator comprises two collimation plates, the two collimation plates are matched in shape to form a collimation port, and the collimation port is configured to limit the ray beam shape of the ray beam output by the corresponding ray generator.

6. The radiation inspection system according to claim 3, wherein the collimator comprises two collimation plates, the two collimation plates are matched in shape to form a collimation port, the radiation scanning imaging device further comprises an adjustment mechanism, and the adjustment mechanism is configured to adjust a size or shape of the collimation port by driving a position of one collimation plate relative to the other collimation plate, and maintain the ray beam shapes of the ray beams output by the plurality of ray generators after adjustment.

7. The radiation inspection system according to claim 6, wherein the adjustment mechanism comprises at least one adjustment part, at least one collimation plate is correspondingly provided with the adjustment part, and the adjustment part is configured to change a relative position of the corresponding collimation plate relative to the other collimation plate by driving the corresponding collimation plate to translate and/or rotate, so as to adjust the size or shape of the collimation port.

8. The radiation inspection system according to claim 7, wherein at least one of the two collimation plates is provided with a long hole with an extension direction different from an extension direction of the collimation port; the radiation scanning imaging device also comprises a ray source cabin body, and the plurality of ray generators are located in the ray source cabin body;
the adjustment part comprises a first threaded connector, and the first threaded connector is configured to cooperate with the long hole variably in relative position and fix the collimation plate where the long hole is located on the ray source cabin body.

9. The radiation inspection system according to claim 1, wherein the container comprises a bottom wall, a top wall, a left wall and a right wall which extend along the length direction, the left wall and the right wall are oppositely disposed along the width direction of the container, the radiation inspection system further comprises a driving device, and the driving device is configured to adjust a distance between the left wall and the right wall to adjust the width of the container during switching of the transportation state and the working state.

10. The radiation inspection system according to claim 1, wherein the container comprises a bottom wall, a top wall, a left wall and a right wall which extend along the length direction, the left wall and the right wall are oppositely disposed along the width direction of the container; and a distance between the left wall and the right wall is adjustable;
the container further comprises a first support part and a second support part which are fixedly connected with the left wall and the right wall respectively, and the radiation scanning imaging device is supported on the first support part and the second support part in the working state;
the rotating device comprises a rotation part and a support frame which are disposed on the container, in the transportation state, the support frame is detachably connected between the rotation part and the radiation scanning imaging device, the radiation scanning imaging device is supported on the support frame, the rotation part is configured to provide power for rotating the radiation scanning imaging device, and during switching between the transportation state and the working state, the rotation part rotates the radiation scanning imaging device through the support frame.

11. The radiation inspection system according to claim 10, wherein the first support part and the second support part both comprise arc-shaped guide rails, the arc-shaped guide rail comprises a fixed end guide rail fixedly connected with the container and an extended end guide rail detachably connected with the fixed end guide rail, in the transportation state and the working state, the extended end guide rail is separated from both the fixed end guide rail and the radiation scanning imaging device, the extended end guide rail is fixedly connected with the fixed end guide rail during switching between the transportation state and the working state, and the fixed end guide rail and the extended end guide rail guide rotation of the radiation scanning imaging device.

12. The radiation inspection system according to claim 1, further comprising a conveying apparatus disposed in the container, wherein the conveying apparatus is configured to convey the object to be inspected entering the container in a working state, wherein the object to be inspected passes through the inspection channel.

13. The radiation inspection system according to claim 12, wherein the conveying apparatus comprises at least one conveyor configured to convey the object to be inspected, the conveyor comprises a self-traveling device, a carrying apparatus and a wheel pitch self-adaptive adjustment apparatus, the carrying apparatus is disposed on the self-traveling device, and the wheel pitch self-adaptive adjustment apparatus is in driving connection with the self-traveling device, and configured to adjust a wheel pitch of the self-traveling device;
a sensor configured to measure width information of the object to be inspected; and
a control apparatus in signal connection with the sensor and the wheel pitch self-adaptive adjustment apparatus, and configured to calculate a target wheel pitch of the self traveling device according to the width information detected by the sensor and control the wheel pitch self-adaptive adjustment apparatus to adjust the wheel pitch of the self traveling device to the target wheel pitch.

14. The radiation inspection system according to claim 13, wherein,
the self-traveling device comprises a first walking part and a second walking part which are disposed at intervals along a transverse direction, and the transverse direction is consistent with the width direction of the container;
the carrying apparatus comprises a first carrying part and a second carrying part which are disposed at intervals along the transverse direction, the first carrying part is disposed on the first walking part, and the second carrying part is disposed on the second walking part; and
the wheel pitch self-adaptive adjustment apparatus is configured to adjust the distance between the first carrying part and the second carrying part along the transverse direction of the conveyor, so as to adjust the distance between the first walking part and the second walking part along the transverse direction, to adjust the wheel pitch of the self-traveling device.

15. The radiation inspection system according to claim 13, wherein the at least one conveyor comprises:
a first conveyor; and
a second conveyor configured to receive and continuously convey the object to be inspected on the first conveyor;
wherein the sensor is disposed on the first conveyor.

16. The radiation inspection system according to claim 13, wherein the control apparatus comprises:
first instruction signal transceiving apparatus in signal connection with the sensor and the wheel pitch self-adaptive adjustment apparatus of a first conveyor;
a second instruction signal transceiving apparatus in signal connection with the wheel pitch self-adaptive adjustment apparatus of a second conveyor; and
an instruction signal transceiving processing apparatus in signal connection with the first instruction signal transceiving apparatus and the second instruction signal transceiving apparatus, and configured to calculate the target wheel pitch according to the width information of the object to be inspected detected by the sensor, control the wheel pitch self-adaptive adjustment apparatus of the first conveyor to adjust the wheel pitch of a first self-traveling device to the target wheel pitch through the first instruction signal transceiving apparatus, and control the wheel pitch self-adaptive adjustment apparatus of the second conveyor to adjust the wheel pitch of the self-traveling device to the target wheel pitch through the second instruction signal transceiving apparatus.

17. The radiation inspection system according to claim 12, wherein the conveying apparatus further comprises an object handling device and at least one conveyor, the at least one conveyor is configured to transport the object to be inspected, and the object handling device is configured to unload the object to be inspected from the conveyor and load the object to be inspected onto the conveyor.

18. The radiation inspection system according to claim 1, wherein the container further comprises a ramp and a bottom wall extending along a length direction, the ramp is rotatably connected with the bottom wall and is arranged at least one of the entrance and the exit to switch between an unfolded state and a folded state, and in the unfolded state, the ramp is configured to provide guidance for the object to be inspected to enter and leave the container.

19. The radiation inspection system according to claim 1, further comprising a first automatic guided transport vehicle configured to move the object to be inspected from a first target position outside the container to a position close to the entrance, and/or the radiation inspection system further comprising a second automatic guided transport vehicle configured to move the object to be inspected from a position close to the exit to a second target position outside the container.

* * * * *